(12) United States Patent
Upah et al.

(10) Patent No.: US 10,479,408 B2
(45) Date of Patent: Nov. 19, 2019

(54) FRAME ASSEMBLY FOR A VEHICLE AND VEHICLE HAVING SAME

(71) Applicant: Honda Motor Co., Ltd., Tokyo (JP)

(72) Inventors: Luke M. Upah, Williamsburg, IA (US); Daniel T. Sellars, West Liberty, OH (US); Dakota D. Kirtland, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 159 days.

(21) Appl. No.: 15/871,349

(22) Filed: Jan. 15, 2018

(65) Prior Publication Data
US 2019/0217894 A1    Jul. 18, 2019

(51) Int. Cl.
| | |
|---|---|
| *B62D 21/00* | (2006.01) |
| *B62D 21/15* | (2006.01) |
| *B62D 21/11* | (2006.01) |
| *B62D 3/12* | (2006.01) |
| *B60R 19/34* | (2006.01) |
| *B60G 7/02* | (2006.01) |
| *B60G 3/20* | (2006.01) |
| *B60K 17/30* | (2006.01) |

(52) U.S. Cl.
CPC ............. *B62D 21/155* (2013.01); *B60G 3/20* (2013.01); *B60G 7/02* (2013.01); *B60K 17/30* (2013.01); *B60R 19/34* (2013.01); *B62D 3/126* (2013.01); *B62D 21/11* (2013.01); *B60G 2200/144* (2013.01); *B60G 2200/156* (2013.01); *B60G 2206/60* (2013.01)

(58) Field of Classification Search
CPC ...... B62D 21/155; B62D 21/11; B62D 3/126; B60R 19/34; B60K 17/30; B60G 7/02; B60G 3/20; B60G 2200/144; B60G 2200/156; B60G 2206/60
USPC .................... 280/124.109; 296/193.1, 203.2
See application file for complete search history.

(56) References Cited

U.S. PATENT DOCUMENTS

| | | |
|---|---|---|
| 3,794,348 A | 2/1974 | Fischer |
| 6,220,655 B1 | 4/2001 | Gure et al. |
| 7,229,099 B2 | 6/2007 | Reim et al. |
| 7,695,056 B2 | 4/2010 | Hanson, Jr. et al. |
| 9,102,205 B2 | 8/2015 | Kvien et al. |

(Continued)

FOREIGN PATENT DOCUMENTS

| | | |
|---|---|---|
| DE | 102012013691 A1 | 1/2013 |
| EP | 2958792 A2 | 12/2015 |

*Primary Examiner* — Toan C To
(74) *Attorney, Agent, or Firm* — Honda Patents & Technologies North America, LLC; Clifford B Vaterlaus

(57) ABSTRACT

A front frame assembly for mounting a front suspension and wheel assembly of a vehicle can include lower frame members, first frame members, second frame members, a cross frame member and a plate. The pair of first and second frame members can be connected to and can extend upwardly from a respective one of the lower frame members. The pair of second frame members can be connected to the respective one of the lower frame members and a respective one of the first frame members. The cross frame member can be connected to and extend from each of the first frame members. The plate can be connected to and can extend from the each of the first frame and second members and the cross frame member. The plate can include a ridge configured to cause the plate to buckle in the longitudinal direction of the vehicle under predetermined conditions.

20 Claims, 16 Drawing Sheets

(56) References Cited

U.S. PATENT DOCUMENTS

| | | | |
|---|---|---|---|
| 9,150,182 B1* | 10/2015 | Schlangen | B60G 3/20 |
| 9,623,912 B2 | 4/2017 | Schlangen | |
| 9,650,078 B2 | 5/2017 | Kinsman et al. | |
| 10,189,428 B1* | 1/2019 | Sellars | B60R 19/34 |
| 10,369,861 B2* | 8/2019 | Deckard | B60G 21/055 |
| 2009/0058141 A1* | 3/2009 | Hirukawa | B60R 19/52 |
| | | | 296/193.1 |
| 2011/0049855 A1* | 3/2011 | Karube | B60G 3/20 |
| | | | 280/798 |
| 2012/0193163 A1 | 8/2012 | Wimpfheimer et al. | |
| 2014/0125030 A1* | 5/2014 | Hara | B62D 21/11 |
| | | | 280/124.134 |
| 2014/0300136 A1* | 10/2014 | Garnweidner | B62D 21/155 |
| | | | 296/187.09 |
| 2015/0061272 A1* | 3/2015 | Watanabe | B62D 21/11 |
| | | | 280/784 |
| 2015/0061275 A1* | 3/2015 | Deckard | B60G 21/055 |
| | | | 280/788 |
| 2016/0347137 A1* | 12/2016 | Despres-Nadeau | B60G 3/202 |
| 2017/0080977 A1* | 3/2017 | Schroeder | B62D 21/11 |
| 2018/0178858 A1* | 6/2018 | Hollman | B60G 21/05 |
| 2018/0273094 A1* | 9/2018 | Komiya | B62D 21/155 |

* cited by examiner

FRAME ASSEMBLY FOR A VEHICLE AND VEHICLE HAVING SAME

BACKGROUND

The disclosed subject matter relates to a vehicle and a frame assembly for the vehicle. More particularly, the disclosed subject matter relates to methods and apparatus that enhance load and energy management performance upon application of external loads and stresses, such as may occur during off-road travel over uneven terrain.

Vehicles, such as but not limited to all-terrain vehicles, can be subjected to relatively large load and/or energy inputs to the frame assembly due to the unevenness of the terrain across which the vehicle is travelling. The all-terrain vehicle can include a generally rigid frame assembly that is designed to withstand the load and energy inputs transmitted from the wheels and through the suspension components during travel over the uneven terrain. For example, space constraints and off-road durability may make it beneficial to provide very stiff portions of the vehicle frame that are spaced from the passenger area, such as but not limited to frame structures around the front suspension components, rear suspension components and/or powertrain components.

SUMMARY

Some embodiments are directed to a front frame assembly of a vehicle. The front frame assembly can be configured to support a front suspension and wheel assembly, and can be configured to be connected to a front portion of a main frame assembly of a vehicle. The main frame assembly can be configured to define a passenger compartment of the vehicle. The front frame assembly can include a pair of lower frame members, a pair of first frame members, a pair of second frame members, a cross frame member and a plate. The pair of lower frame members can extend in a longitudinal direction of the vehicle and can be spaced apart from each other in a transverse direction of the vehicle. Each of the lower frame members can include a first end configured to be connected to the main frame assembly. The pair of first frame members can be connected to and can extend upwardly from a respective one of the lower frame members. The pair of second frame members can be connected to and can extend upwardly from a respective one of the lower frame members. Each of the second frame members can have a first end connected to the respective one of the lower frame members and a second end connected to a respective one of the first frame members. Each of the first frame members and the second frame members can be configured to movably support a different respective portion of the front suspension and wheel assembly. The cross frame member can be connected to and can extend from each of the first frame members. The plate can be connected to and can extend from the each of the first frame members, the cross frame member, and the second frame members such that a load or kinetic energy applied to any one of first and second frame members by the front suspension and wheel assembly is transferred to each of the lower frame members when the front suspension and wheel assembly is connected to the first and second frame members. The plate can include a ridge extending in a transverse direction of the vehicle and can be configured to cause the plate to buckle in the longitudinal direction of the vehicle if a load or kinetic energy applied to the plate in the longitudinal direction of the vehicle exceeds a predetermined threshold. The plate can include a bottom surface that faces the lower frame members. The steering rack assembly can include a steering rack housing and a steering rack supported in the steering housing and movable in the housing along the transverse direction of the vehicle. The steering rack housing can be mounted to the bottom surface of the plate.

Some embodiments are directed to a frame assembly for a vehicle that can include a main frame assembly, rear frame assembly, and a front frame assembly. The main frame assembly can define a passenger compartment of the vehicle. The rear frame assembly can be connected to and can extend from a rear end of the main frame assembly. The rear frame assembly can be configured to mount at least a portion of a rear suspension and wheel assembly. The front frame assembly can be connected to and can extend from a front portion of the main frame assembly of the vehicle such that the main frame assembly extends between the front frame assembly and the rear frame assembly in a longitudinal direction of the vehicle. The front frame assembly can be configured to mount a front suspension and wheel assembly. The front frame assembly can include a pair of lower frame members, a pair of first frame members, a pair of second frame members, a cross frame member and a plate. The pair of lower frame members can extend in a longitudinal direction of the vehicle and can be spaced apart from each other in a transverse direction of the vehicle. Each of the lower frame members can include a first end configured to be connected to the main frame assembly. The pair of first frame members can be connected to and can extend upwardly from a respective one of the lower frame members. The pair of second frame members can be connected to and can extend upwardly from a respective one of the lower frame members. Each of the second frame members can have a first end connected to the respective one of the lower frame members and a second end connected to a respective one of the first frame members. Each of the first frame members and the second frame members can be configured to movably support a different respective portion of the front suspension and wheel assembly. The cross frame member can be connected to and can extend from each of the first frame members. The plate can be connected to and can extend from the each of the first frame members, the cross frame member, and the second frame members such that a load or kinetic energy applied to any one of first and second frame members by the front suspension and wheel assembly is transferred to each of the lower frame members when the front suspension and wheel assembly is connected to the first and second frame members. The plate can include a ridge extending in a transverse direction of the vehicle and can be configured to cause the plate to buckle in the longitudinal direction of the vehicle if a load or kinetic energy applied to the plate in the longitudinal direction of the vehicle exceeds a predetermined threshold. The plate can include a bottom surface that faces the lower frame members. The steering rack assembly can include a steering rack housing and a steering rack supported in the steering housing and movable in the housing along the transverse direction of the vehicle. The steering rack housing can be mounted to the bottom surface of the plate.

Some embodiments are directed to a front frame assembly of a vehicle. The front frame assembly can be configured to support a front suspension and wheel assembly and configured to be connected to a front portion of a main frame assembly of a vehicle. The main frame assembly can be configured to define a passenger compartment of the vehicle. The front frame assembly can include a pair of first frame members extending upwardly, a pair of second frame members extending upwardly, and a plate. The plate can be connected to and extend from each of the first frame members and the second frame members. The plate can include a ridge extending in a transverse direction of the vehicle and can be configured to cause the plate to buckle in the longitudinal direction of the vehicle if a load or kinetic energy applied to the plate in the longitudinal direction of the vehicle exceeds a predetermined threshold.

Some embodiments are directed to an all-terrain vehicle that can include a frame assembly, a pair rear wheels, a steering rack assembly, a front suspension and wheel assembly, a final drive assembly, and a load and energy management apparatus. The frame assembly can include a main frame assembly, a rear frame assembly and a front frame assembly. The main frame assembly can define a passenger compartment of the vehicle. The rear frame assembly can be connected to and can extend from a rear end of the main frame assembly. The front frame assembly can be connected to a front portion of the main frame assembly of the vehicle such that the main frame assembly is located between the front frame assembly and the rear frame assembly in the longitudinal direction of the vehicle. The front frame assembly can include a pair of lower frame members, a pair of first frame members, a pair of second frame members, a cross frame member, a plate, and a bumper assembly. Each of the lower frame members can include a first end connected to the main frame assembly. The pair of first frame members can be connected to and can extend upwardly from a respective one of the lower frame members. Each of the first frame members can include a suspension bracket. The pair of second frame members can be connected to and can extend upwardly from a respective one of the lower frame members. Each of the second frame members can have a first end connected to the respective one of the lower frame members and a second end connected to a respective one of the pair of first frame members. The cross frame member can be connected to and can extend between each of the first frame members. The plate can be connected to the each of the first frame members, the cross frame member, and the second frame members. The plate can include a bottom surface that faces the lower frame members. The bumper assembly can be connected to each of the first frame members. The pair of rear wheels can be mounted to the rear frame assembly. The steering rack assembly can include a steering rack housing and a steering rack. The steering rack housing can be mounted on the bottom surface of the plate. The steering rack can be supported in the steering rack housing and can be movable relative to the steering rack housing in the transverse direction of the vehicle. The front suspension and wheel assembly can include a pair of suspension members and a pair of wheels. Each suspension member can be movably connected to a respective one of the suspension brackets. Each of the wheels can be movably connected to a respective one of the suspension members, and each of the wheels can be operatively connected to the steering rack. The front final drive assembly can be mounted on the lower frame members. The front final drive assembly can include a housing and a pair of drive shafts. Each drive shaft can be rotatably connect a respective one of the wheels to the final drive assembly. The load and energy management apparatus can include: the suspension brackets connected to the first frame members at a first location on the first frame members; a pair of housing brackets connected on the bottom surface of the plate, and each of the housing brackets abuts a respective one of the suspension brackets; a housing extension extending in the transverse direction of the vehicle from the housing of the front final drive assembly to each of the housing mounting brackets, and the housing extension is connected to each of the housing brackets; and the bumper assembly connected to a second location on each of the first frame members that is adjacent to the first location, wherein the load and energy management apparatus transmits a load or an energy input to one of the first frame members to each of the lower frame members via the housing extension and a different one of the first frame members, the load and energy management apparatus transmits a load or an energy input by the bumper assembly to the plate such that the plate resists a load or an energy input via the bumper assembly until the bumper assembly initially collapses in the longitudinal direction of the vehicle, and the plate is configured to collapse in a direction toward the main frame assembly if the load or the energy continues to be inputted to the front frame members via the bumper assembly after the bumper assembly initially collapses.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
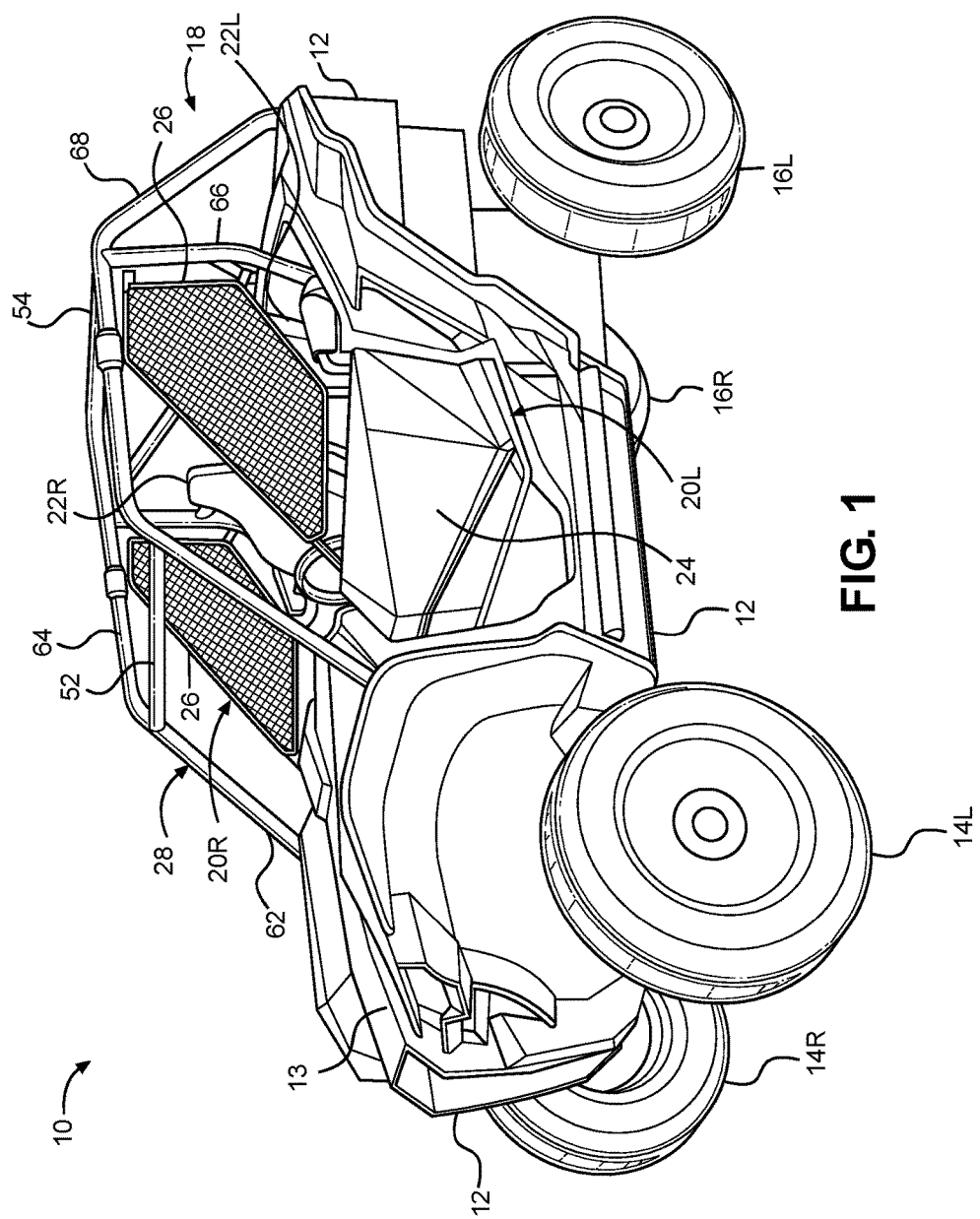
FIG. 1 is a perspective view of a vehicle made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Various vehicular design factors may make it challenging to sufficiently impede or prevent deformation of the vehicle frame defining the passenger area upon application of significant force inputs into the frame assembly. The stiff portions of the vehicle frame that are spaced from the passenger area, such as but not limited to frame structures around the front suspension components, rear suspension components and/or powertrain components, can transmit most of or the entire load or kinetic energy input to the portion of the vehicle frame defining the passenger area. Typical vehicle frame design constraints and requirements may also limit the use of structures for managing the input load or kinetic energy. As a result, the portion of the vehicle frame defining the passenger area can be subject to deformation due to the input load or kinetic energy.

It may therefore be beneficial to provide a vehicle and a frame for the vehicle with an apparatus that addresses at least one of the above and/or other challenges of related art vehicles. In particular, it may be beneficial to enhance input load and energy management performance upon application of an external load, such as by controlling deformation of the vehicle frame and/or mitigating energy transmission to the passenger area caused by the input load or kinetic energy. For example, portions of the vehicle frame assembly can be configured to absorb and transfer, in a predetermined controlled manner, the load or kinetic energy that originated from the input load or kinetic energy.

In some of these and/or other embodiments, the vehicle frame can be configured to deform at portions spaced from the passenger area. In addition, the frame can be configured with structures that can resist deformation during routine off-road usage of the vehicle, but that can deform in a predetermined controlled manner in response to an input load or kinetic energy. In some of the disclosed and/or other embodiments, the vehicle frame can be configured to deform in the vicinity of the passenger area in a predetermined controlled manner so that the dimensions of the passenger area after loading can be substantially the same as the dimensions of the passenger area prior to the input load or kinetic energy.

It may therefore be beneficial to provide a vehicle with a frame assembly that addresses at least one of the above and/or other disadvantages or concerns of the related art. In particular, it may be beneficial to utilize a frame assembly that is sufficiently rigid to cope with load and/or energy inputs from the suspension as the vehicle travels over uneven terrain of an unimproved path, and that is sufficiently deformable in a predetermined controlled manner in response to load and/or energy inputs different from those input by the suspension. For example, it may be beneficial to utilize a frame assembly that includes a front frame assembly that is configured to distribute loads and/or energy input by each suspension component throughout the entire frame assembly such that the suspension load and/or energy inputs can be transferred to a main frame assembly to which the front frame assembly can be connected.

FIG. 1 is a perspective view of an exemplary vehicle 10 including frame assembly 18 in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
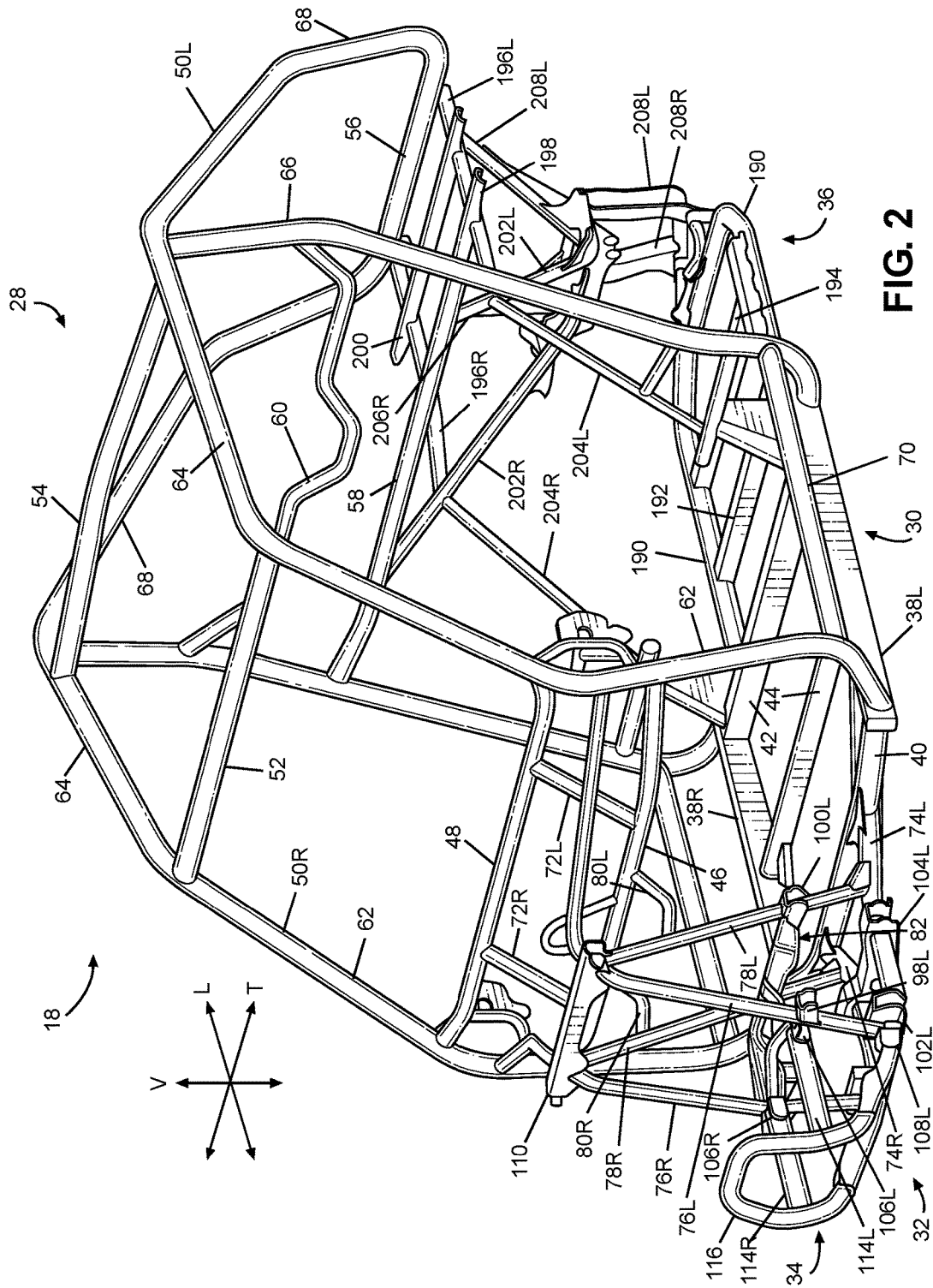
FIG. 2 is perspective view of a frame assembly of the vehicle of FIG. 1.

The vehicle 10 can include a body 12, a pair of front wheels, 14L, 14R, a pair of rear wheels 16L, 16R, a frame assembly 18, a pair of door assemblies 20L, 20R, and a powertrain. Portions of the frame assembly 18 are hidden from view in FIG. 1 by the body 12 (but are shown in FIG. 2), and the powertrain is omitted from FIG. 1 for simplicity and clarity of the drawing.

The vehicle 10 can include a pair of front seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area.

The door assemblies 20L, 20R, which occupy the door openings, each can include a door 24 and a window panel assembly 26, and can be configured to selectively open and close access through the door openings by moving between a closed position and a fully opened position. (The door 24 of the right-side door assembly 20R is obscured from view in FIG. 1). In the closed position, the door assemblies 20L, 20R, can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. FIG. 1 shows the door assemblies 20L, 20R in the closed position.

The powertrain can include an internal combustion engine, one or more electric motor(s) or a hybrid of an internal combustion engine and one or more electric motor (s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. Frame Assembly

FIG. 2 is a perspective view of the frame assembly 18. The frame assembly 18 can be configured to support the body 12, door assemblies 20L, 20R, seats 22L, 22R, suspension components for the wheels 14L, 14R, 16L, 16R, powertrain, steering system, control pedal assemblies, passengers and cargo items. The frame assembly 18 can be configured to withstand various modes of operation, including operation on unimproved paths. As will be discussed in greater detail below, the frame assembly 18 can be configured to surround the passenger area.

The frame assembly 18 can include a main frame assembly 30, a front frame assembly 32, a front bumper assembly 34 and a rear frame assembly 36. As will be discussed in greater detail below, a load and energy management apparatus can distribute loads input by the front suspension on one side of the front frame assembly 32 to the other side of the front frame assembly 32. Further, the load and energy management system can distribute and attenuate loads and energy throughout the front frame assembly 32 that are applied to the front bumper assembly 34 to thereby manage the energy so that any deflection of the frame assembly 18 in the vicinity of the passenger area can be controlled in an advantageous predetermined manner.

The main frame assembly 30 can define the passenger area of the vehicle 10. The main frame assembly 30 can be configured to provide an overall bending stiffness and torsional stiffness of the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/systems, such as but not limited to portions of the body 12, a front final drive assembly, steering system components, engine cooling system, headlights, etc.

The front bumper assembly 34 can be connected to the front end of the front frame assembly 32, such that the front frame assembly 32 can be located between the front bumper assembly 34 and the main frame assembly 30. The front bumper assembly 34 can extend beyond the exterior of the body 12, or alternatively, one or more portions of the body 12 can conceal the front bumper assembly 34.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Main Frame Assembly

The main frame assembly 30 can define the passenger area and can include the roll cage 28, a pair of longitudinal members 38L, 38R and a plurality of lower cross members 40, 42, 44, a pair of upper cross members 46, 48 and a pair of support members 72L, 72R.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second and third lower cross members 42, 44 can be configured as a substantially straight, hollow beam having a substantially rectangular cross-sectional shape.

The first lower cross member 40 can be connected to each of the longitudinal members 38L, 38R adjacent a respective front end of the longitudinal members 38L, 38R. The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIG. 2, welds can connect the lower cross members 40, 42, 44 to the longitudinal members 38L, 38R.

The first and second upper cross members 46, 48 can extend in the transverse direction T of the vehicle 10 from the left cage side assembly 50L to the right cage side assembly 50R. The first upper cross member 46 can be spaced away from the second upper cross member 48. The second upper cross member 48 can be connected to the cage side assemblies 50L, 50R at a position that is higher in the vertical direction V of the vehicle 10 than the position at which the first upper cross member 46 is connected to the side assemblies 50L, 50R.

The support members 72L, 72R can extend generally in the vertical direction V of the vehicle 10 from the first upper cross member 46 to the second upper cross member 48. The support member 72L, 72R can be spaced apart from each other in the transverse direction T of the vehicle 10. The support members 72L, 72R can each be configured as a hollow tube having a substantially circular cross-sectional shape. In the exemplary embodiment of FIG. 2, welds can connect the support members 72L, 72R to the upper cross members 46, 48.

The upper cross members 46, 48 and the support members 72L, 72R can be configured to support and secure a panel assembly (such as but not limited to an instrument panel assembly), a steering assembly, and/or a portion of the body 12 (such as but not limited to a hood panel 13—see FIG. 1).

The roll cage 28 can include a pair of cage side assemblies 50L, 50R, a plurality of cage cross members 52, 54, 56, 58, 60. The roll cage 28 generally defines the passenger compartment.

The cage side assemblies 50L, 50R can extend in the longitudinal direction L of the vehicle 10, from the front end of the passenger area to the rear end of the passenger area. The cage side assemblies 50L, 50R can define the limits of the passenger area in the transverse direction T of the vehicle 10, the longitudinal direction L of the vehicle 10 and in the vertical direction V of the vehicle 10. The cage side assemblies 50L, 50R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The cage side assemblies 50L, 50R can be configured to resist, impede, or minimize deformation that could be caused by a load or kinetic energy input into either or both of the cage side assemblies.

Each of the cage side assemblies 50L, 50R can be formed from any appropriate number of structural elements, from one to any number greater than one. The side cage assemblies 50L, 50R can be configured with any shape and contour that can be advantageous to meet the structural performance and aesthetic appeal desired for the vehicle 10. The following description will be directed toward the left cage side assembly 50L with the understanding that the right cage side assembly 50R can be a mirror image of the left cage side assembly 50L.

The left cage side assembly 50L can include a plurality of cage side members 62, 64, 66, 68, 70. Each of the first through fifth cage side members 62, 64, 66, 68, 70 can be configured as a hollow tube having a substantially circular cross-section shape. The cage side members 62, 64, 66, 68, 70 can be configured with any appropriate elongated shape that can provide the desired dimensionality of the passenger area and advantageously conform to the aesthetic appearance desired for the vehicle 10.

The first cage side member 62 can be referred to as an A-pillar. The first cage side member 62 can be connected at one end to the left longitudinal member 38L adjacent the front end of the left longitudinal member 38L. The first cage side member 62 can be connected to a side of the left longitudinal member 38L that can be opposite to the side to which the first cross member 40 is connected. The one end of the first cage side member 62 can be aligned in the transverse direction T with the end of the first cross member 40 that is connected to the left longitudinal member 38L.

Each of the upper cross members 46, 48 can be connected to a middle portion of the first cage side member 62 of each of the cage side assemblies 50L, 50R.

The third cage side member 66 can be referred to as a B-pillar. The third cage side member 66 can be connected at one end to the left longitudinal member 38L adjacent the rear end of the left longitudinal member 38L. The third cage side member 66 can be connected to a side of the left longitudinal member 38L that can be opposite to the side to which the second lower cross member 42 is connected. The one end of the third cage side member 66 can be aligned in the transverse direction T with the end of the second cross member 42 that is connected to the left longitudinal member 38L.

The first through fifth cage cross members 52, 54, 56, 58, 60 can extend in the transverse direction T of the vehicle 10 from the left side assembly 50L to the right side assembly 50R. The cage cross members 52, 54, 56, 58, 60 can be connected to each of the side assemblies 50L, 50R at respective locations spaced apart along the longitudinal direction L of the vehicle 10. The cage cross members 52, 54, 56, 58, 60 can be configured to maintain a predetermined spacing between the left cage side assembly 50L and the right cage side assembly 50R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 2, the cage cross members 52, 54, 56, 58, 60 can be connected to the cage side assemblies 50L, 50R by welding.

B. Front Frame Assembly

Referring to FIG. 2, the front frame assembly 32 can be connected to the first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate members 80L, 80R and a transverse frame assembly 82.

The front frame members 76L, 76R, 78L, 78R can be spaced apart from each other in the transverse direction T of the vehicle 10 by a predetermined distance sufficient to accommodate any component(s) and/or system(s) to be supported by the front frame assembly 32. Referring to FIGS. 3, 4, 10, 11 and 13-15, the front frame assembly 32 can be configured to support a front suspension and wheel assembly, a radiator 84, a steering rack assembly 86 and a front final drive assembly 88. The front suspension and wheel assembly can include suspension members 90L, 90R, 92L, 92R, damper and spring assemblies 94L, 94R, front hub assemblies 96L, 96R and the front wheels 14L, 14R.

The front frame assembly 32 can include a plurality of mounting brackets 98L, 98R, 100L, 100R, 102L, 102R, 104L 104R, 106L, 106R, 108L, 108R that can connect the front suspension and wheel assembly, the radiator 84, and the front bumper assembly 34 to the front frame assembly 32. The front suspension and wheel assembly can be movably connected to each of the suspension brackets 98L, 98R, 100L, 100R, 102L, 102R, 104L, 104R so that the suspension members 90L, 90R, 92L, 92R can pivot relative to the suspension brackets 98L, 98R, 100L, 100R, 102L, 102R, 104L, 104R and the front wheels 14L, 14R can move generally in the vertical direction V of the vehicle 10 as the vehicles travels along an improved or unimproved pathway. The front bumper assembly 34 can be connected to each of the bumper brackets 106L, 106R, 108L, 108R. The following description will be directed toward the brackets 98L, 100L, 102L, 104L, 106L, and 108L mounted on left side of front frame assembly 32 with the understanding that the brackets 98R, 100R, 102R, 104R, 106R, 108R mounted on the right side of the front frame assembly 32 can be a mirror image of the brackets 98L, 100L, 102L, 104L, 106L, 108L left side of the front frame assembly 32, and can be connected to the right side of the front frame assembly 32 in a similar manner.

Referring to FIGS. 2-15, the left side of the front frame assembly 32 can include a pair of upper suspension brackets 98L, 100L, a pair of lower suspension brackets 102L, 104L. Referring to FIGS. 3, 4, 10, 11, 14, the upper suspension member 90L can be connected to each of the upper suspension brackets 98L, 100L. The lower suspension member 92L can be mounted to the lower suspension brackets 102L, 104L in any appropriate manner such as but not limited to threaded fasteners, and with or without rubber bushings. The front bumper assembly 34 can be mounted to the upper bumper bracket 106L and the lower bumper bracket 108L in any appropriate manner such as but not limited to threaded fasteners.

The front frame assembly 32 can include an upper bracket 110. The upper bracket 110 can be connected to and extend from each of the first frame members 76L, 76R. The upper bracket 110 can extend in the transverse direction T of the vehicle 10 to span from the left first frame member 76L to the right first frame member 76L.

Figure 3:
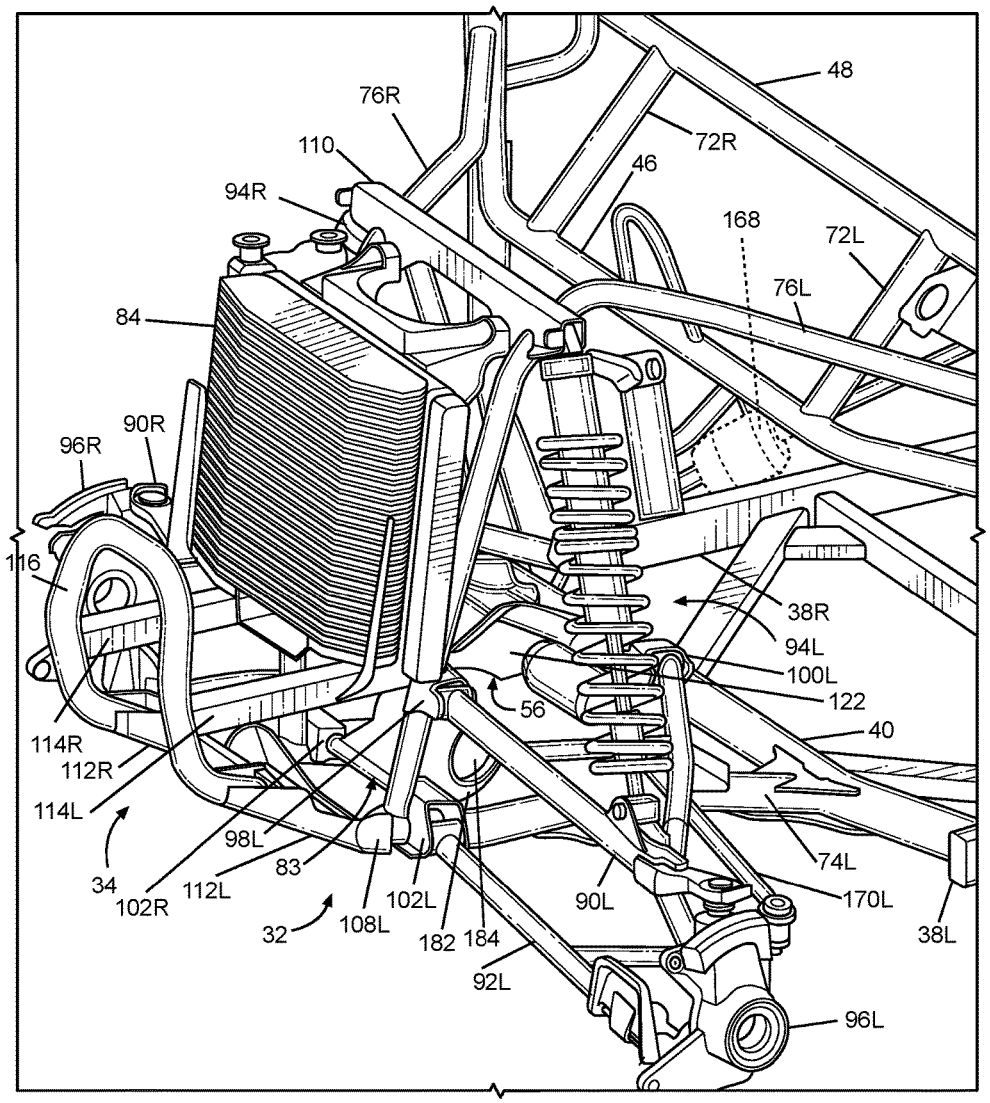
FIG. 3 is a partial perspective view of the frame assembly of FIG. 2 and attached components of the vehicle of FIG. 1.

Referring to FIG. 3, an upper end of each of the spring and damper assemblies 94L, 94R can be connected to a respective end of the upper bracket 110 in an appropriate manner such as but not limited to threaded fasteners.

Figure 7:
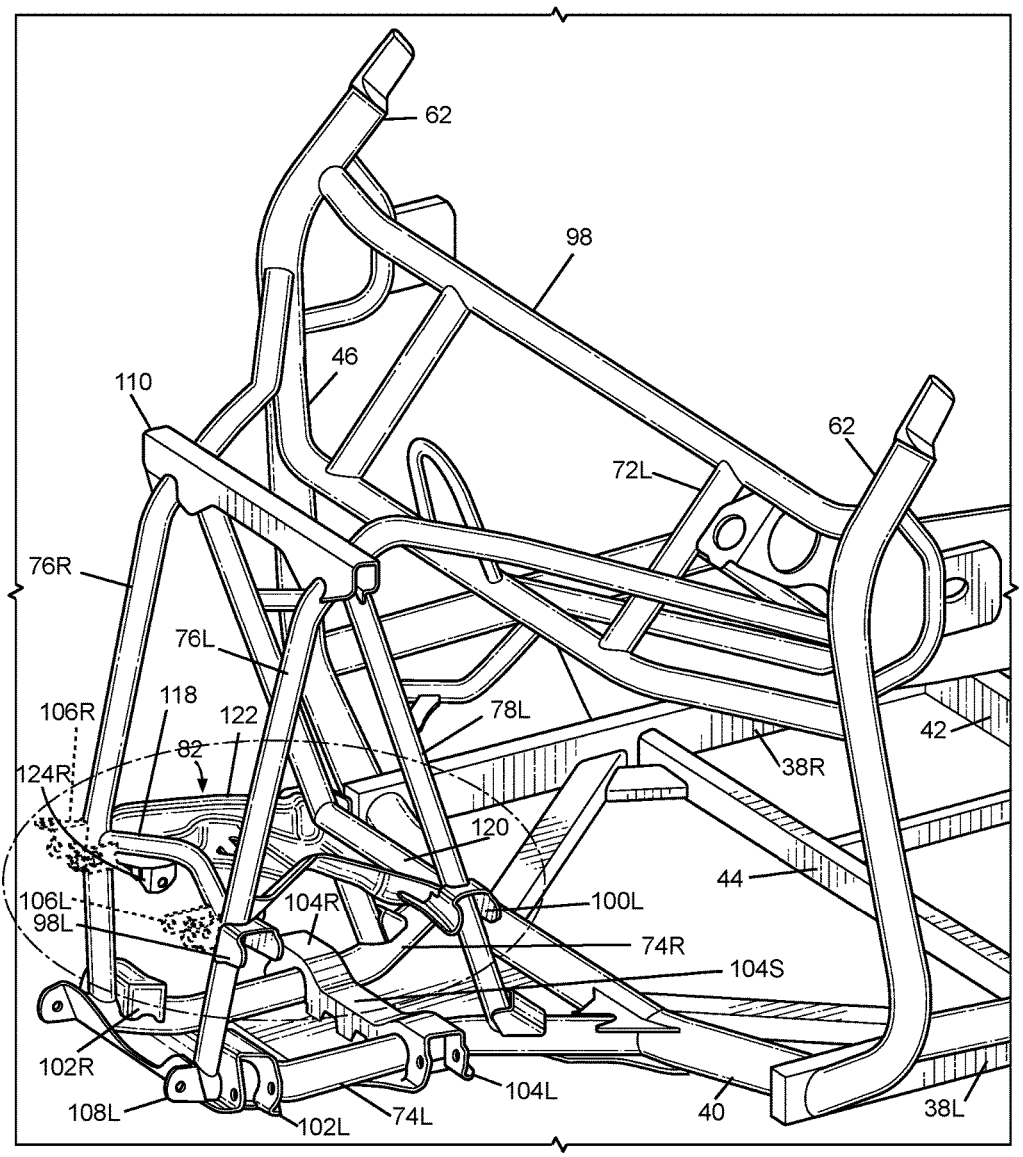
FIG. 7 is a partial perspective view of the frame assembly of FIG. 2.

In the exemplary embodiment of FIG. 7 a central span 104S connects the second lower suspension brackets 104L, 104R to each other to form an integrated homogenous lower bracket assembly. However, exemplary embodiments are intended to include or otherwise cover the second lower suspension brackets formed individually and spaced apart from each other.

In the exemplary embodiment of FIG. 7, each of the front lower frame members 74L, 74R, the first front frame members 76L, 76R, the second front frame members 78L, 78R are configured as hollow metal tubes having a substantially circular cross-section. However, any combination of the front lower frame members 74L, 74R, the first front frame members 76L, 76R and the second front frame members 78L, 78R can be have a cross-sectional shape that is different from a substantially circular cross-sectional shape. Further, any combination of the front lower frame members 74L, 74R, the first front frame members 76L, 76R and the second front frame members 78L, 78R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, the second front frame members 78L, 78R can be welded to each other to form the structure described above. However, embodiments are intended to include or otherwise cover any combination of the front lower frame members 74L, 74R, the first front frame members 76L, 76R and the second front frame members 78L, 78R connected by threaded fasteners, adhesives, a combination of brackets and threaded fasteners, rivets, or other known connective structures, materials, or methods.

The front frame assembly 32 can include a pair of upper bumper brackets 106L, 106R and a pair of lower bumper brackets 108L. (The upper bumper brackets 106L, 106R are shown in phantom in FIGS. 7-9, 12, 13 and 15).

C. Front Bumper Assembly

Figure 4:
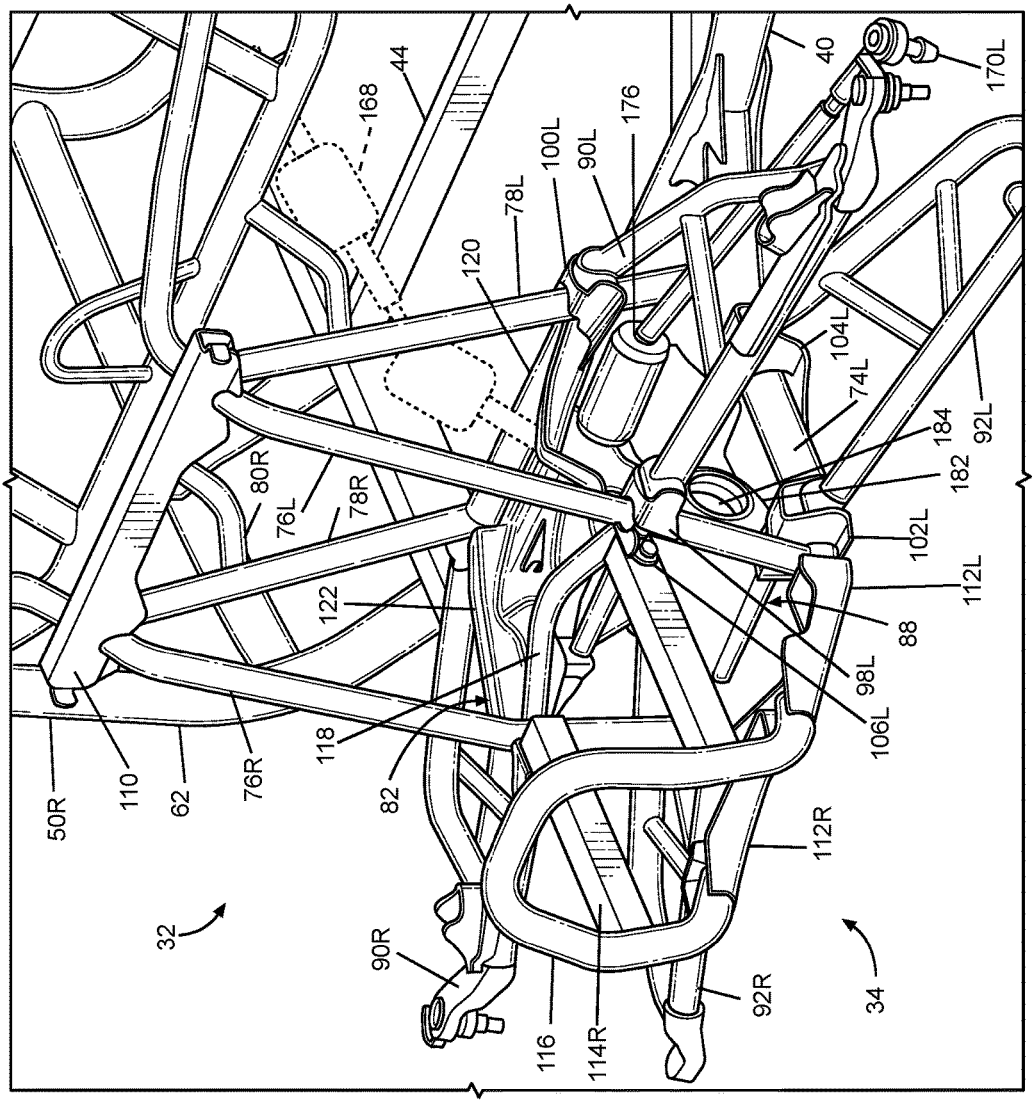
FIG. 4 is a partial perspective view of the frame assembly of FIG. 2 and attached components of the vehicle of FIG. 1.

The front frame assembly 32 can include the front bumper assembly 34. Referring to FIGS. 2-4, the front bumper assembly 34 can be connected to the front side of the first frame members 76L, 76R, such that the first and second frame members 76L, 76R, 78L, 78R are located between or intermediate the front bumper assembly 34 and the main frame assembly 30.

The front bumper assembly 34 can include a pair of lower connector members 112L, 112R, a pair of upper connector members 114L, 114R and a bumper member 116. The bumper member 116 can be a separate structure connected to each of the connector members 112L, 112R, 114L, 114R, or can all be integrated together into a single structure. The bumper member 116 can extend in the transverse direction T of the vehicle 10 to span from the left upper connector member 114L to the right upper connector member 114R.

A first end of each of the lower connector members 112L, 112R can be connected to a respective one of the lower bumper brackets 108L, 108R. Lower connector members 112L, 112R can be connected to the respective one of the bumper brackets such that the lower bumper brackets 108L, 108R can pivot with respect to the lower bumper brackets. The second end of the lower connector members 112L, 112R can be connected to the bumper member 116.

A first end of the upper connector members 114L, 114R can be connected to a respective one of the upper bumper brackets 106L, 106R. The second end of the upper connector members 114L, 114R can be connected to the bumper member 116.

The upper connector members 114L, 114R can be configured to deform in a predetermined and controlled manner in response to load or kinetic energy input to the bumper member 116 that exceeds a predetermined threshold. For example, the upper connector members 114L, 114R can be configured to collapse along the length of the upper connector members 114L, 114R. That is, the upper connector members 114L, 114R can be formed from any material and/or with any structure that can promote the desired deformation. By way of example only, FIGS. 2-4, show the upper connector members 114L, 114R as elongate members having a rectangular cross-sectional shape. Further, by way of example only, the upper connector members 114L, 114R can include one or more holes, cutouts, corrugated regions, bends, any combination thereof, etc., that can permit the upper connector members 114L, 114R to deform in a predetermined and controlled manner during an impact event.

The lower connector members 112L, 112R can pivot relative the lower bumper brackets 108I, 108R as the upper connector members 114L, 114R collapse. However, exemplary embodiments are intended to include any appropriate connection that can achieve the desired performance of the bumper assembly 34 in response to a load and/or energy that exceeds a predetermined threshold. The predetermined threshold can be set at a value where only the front bumper assembly 34 is subjected to deformation by the load or kinetic energy input to the bumper member 116, without deformation to the front frame assembly 32 or the main frame member 30.

The bumper member 116 can be configured with any appropriate shape and dimensions that can achieve the desired performance of the front bumper assembly 34 in response to the load or kinetic energy input.

Figure 8:
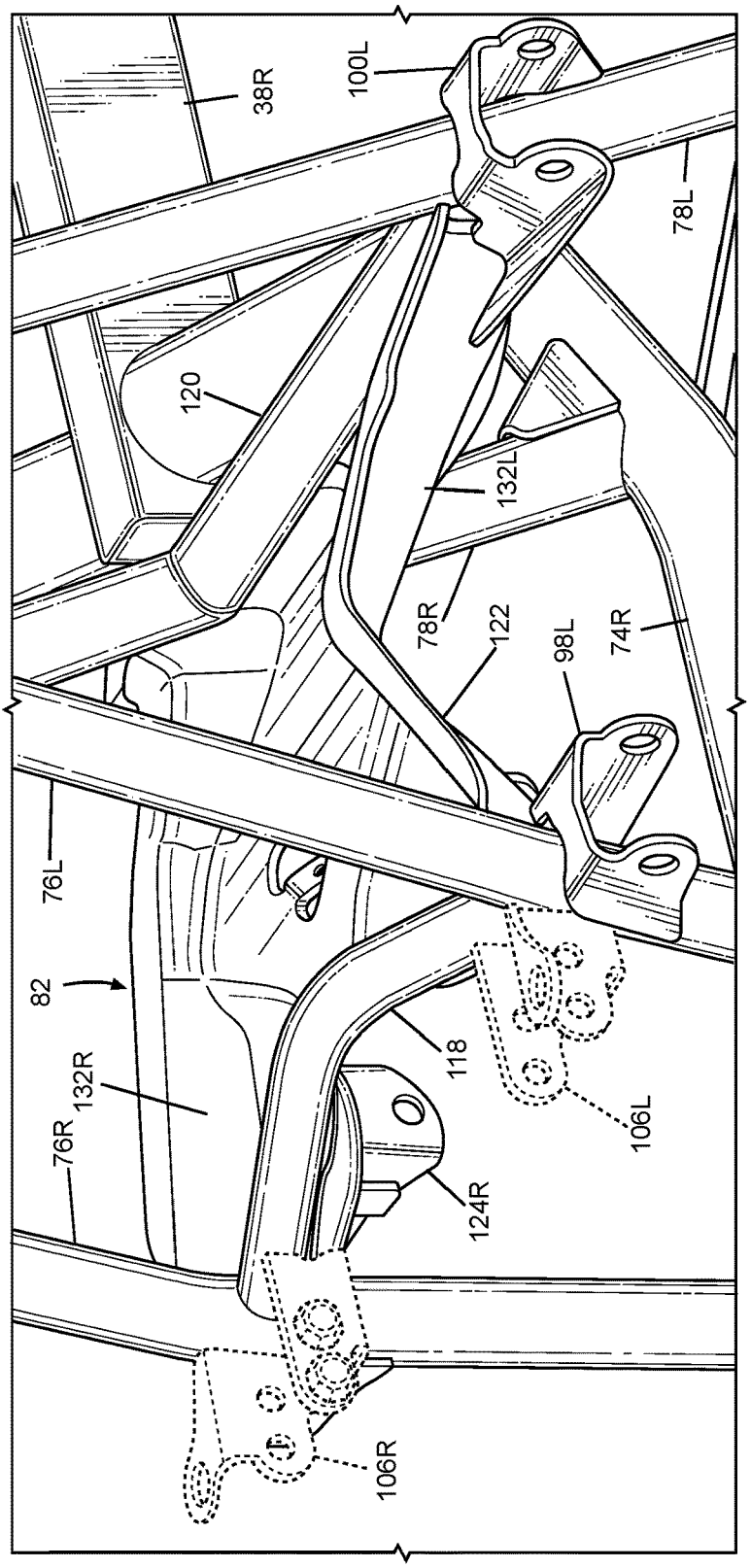
FIG. 8 is an enlarged view of a portion of FIG. 7.

Referring to FIGS. 3 and 8, the upper bumper brackets 106L, 106R can include a flange to which a bottom of the radiator 84 can be connected in any appropriate manner such as but not limited to threaded fasteners, rivets, and welding. In an exemplary embodiment, each of the upper bumper brackets 106L, 106R can include a hole and the radiator 84 can include a pair of posts. A rubber grommet can be secured in each bracket hole. The radiator posts can be inserted into the grommets and the top end of the radiator 84 can be bolted to an appropriate portion of the front frame assembly 32.

D. Transverse Frame Assembly

The transverse frame assembly 82 can extend in the longitudinal direction L, the transverse direction T and the vertical direction V. Referring to FIGS. 2-4 and 7-15, the transverse frame assembly 82 can be connected to and extend from each of the first and second frame members 76L, 76R, 78L, 78R. As will be discussed in detail below, the transverse frame assembly 82 can be configured to cooperate with the front final drive assembly 88 to transfer load or kinetic energy inputs from the front suspension and wheel assembly into each of the front lower frame members 74L, 74R, which in turn, can be configured to transfer the load or kinetic energy input into the first lower cross member 40 of the main frame assembly 30.

Referring to FIGS. 4, 7-13 and 15, the transverse frame assembly 82 can include a first front cross member 118, a second front cross member 120, a plate 122, a pair of housing brackets 124L, 124R. (The front bumper assembly 34 and/or the left first frame member 76L and the left first upper suspension bracket 98L obstruct the left-side housing bracket 124L in FIGS. 4, 7 and 8. Refer to FIGS. 9-13 and 15 for views of both housing brackets 124L, 124R.)

Figure 10:
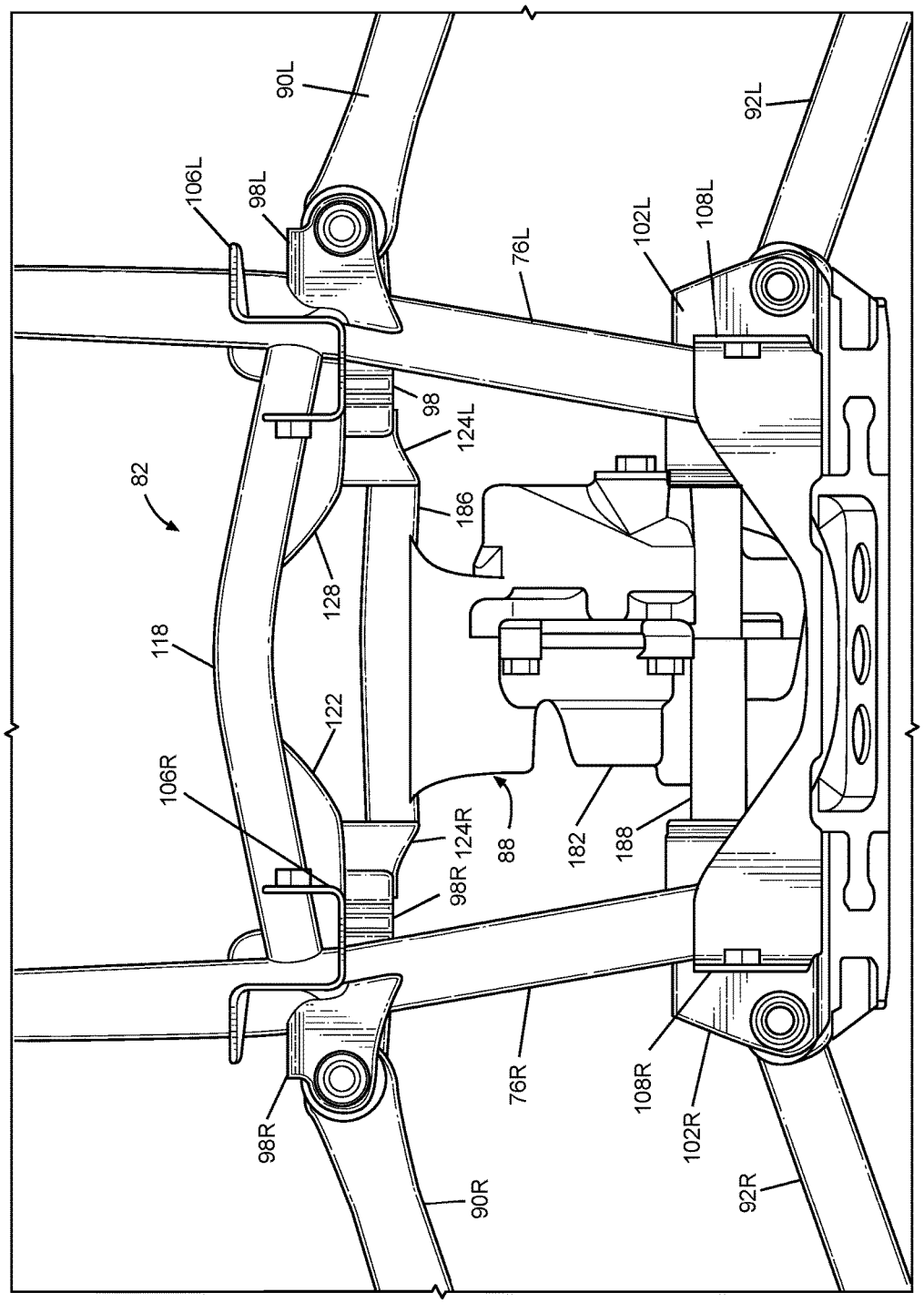
FIG. 10 is a front view of a front portion of the frame of FIG. 2 and attached components of the vehicle.
Figure 11:
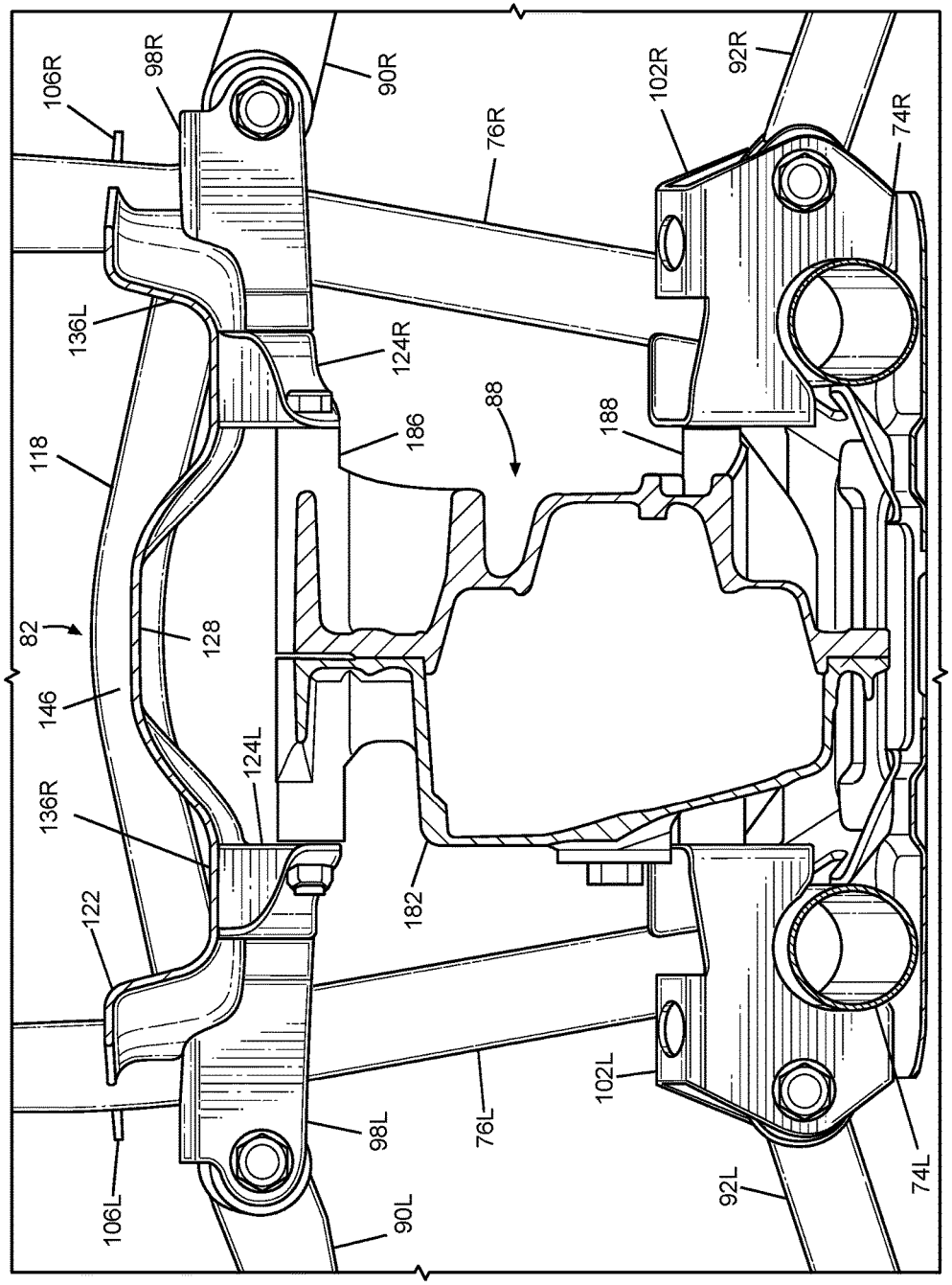
FIG. 11 is a rear view of a front portion of the frame of FIG. 2 and attached components of the vehicle.
Figure 12:
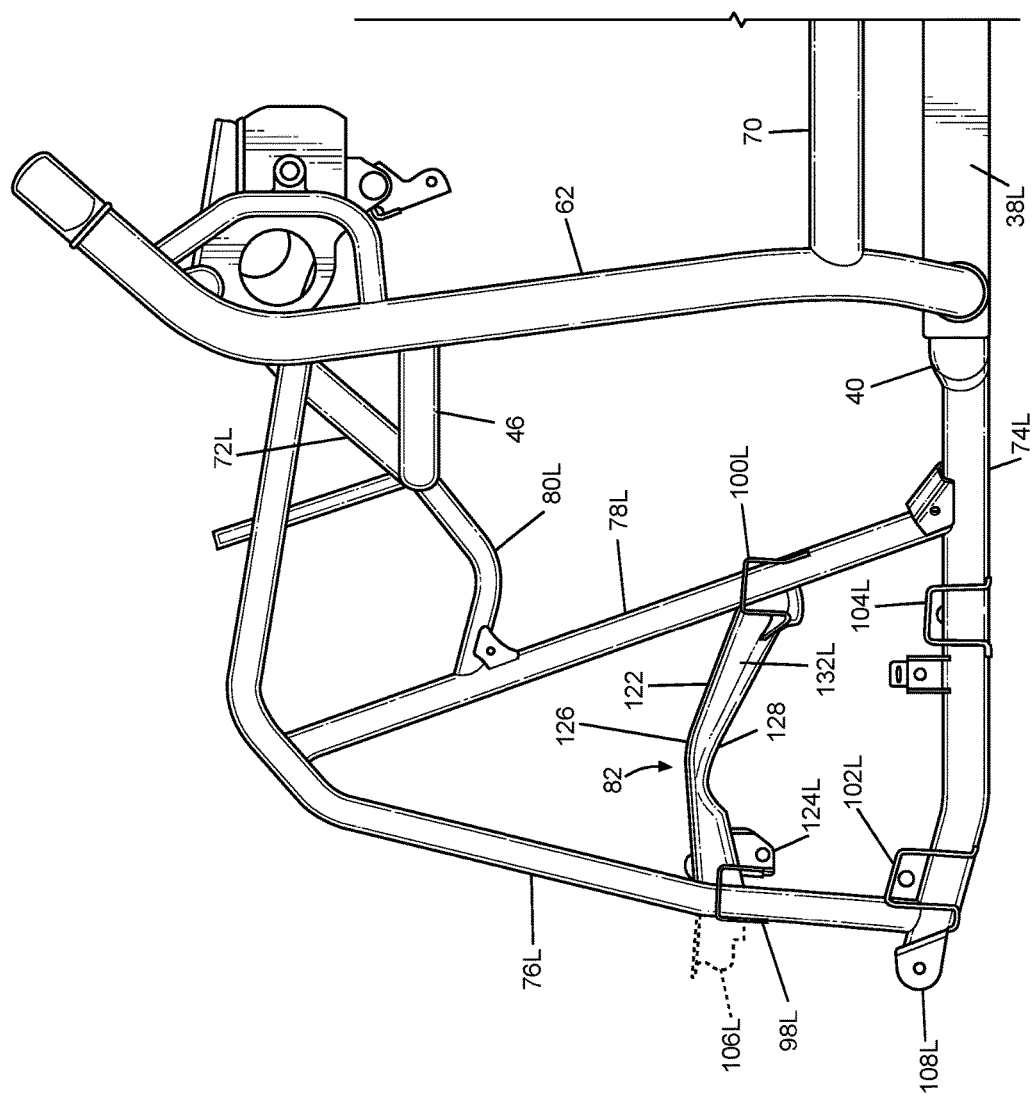
FIG. 12 is a side view of a front portion of the frame assembly of FIG. 2.

The first front cross member 118 can be connected to and can extend from each of the first frame members 76L, 76R. The first front cross member 118 can extend in the transverse direction T of the vehicle 10. Referring to FIG. 10, the first front cross member 118 can be connected to each of first frame members 76L, 76R at a location that generally opposes the location at which the first upper suspension brackets 98L, 98R are connected to the first frame members 76L, 76R. For example, the first front cross member 118 can be connected to an area of the first frame members 76L, 76R that opposes at least a portion of an area on the first frame members 76L, 76R to which the first upper suspension brackets 98L, 98R are mounted. The first front cross member 118 can be curved or bent at a central portion such that the first front cross member 118 is arched upwardly in the vertical direction V of the vehicle 10, and the arch extends away from the lower front lower frame members 74L, 74R.

Figure 14:
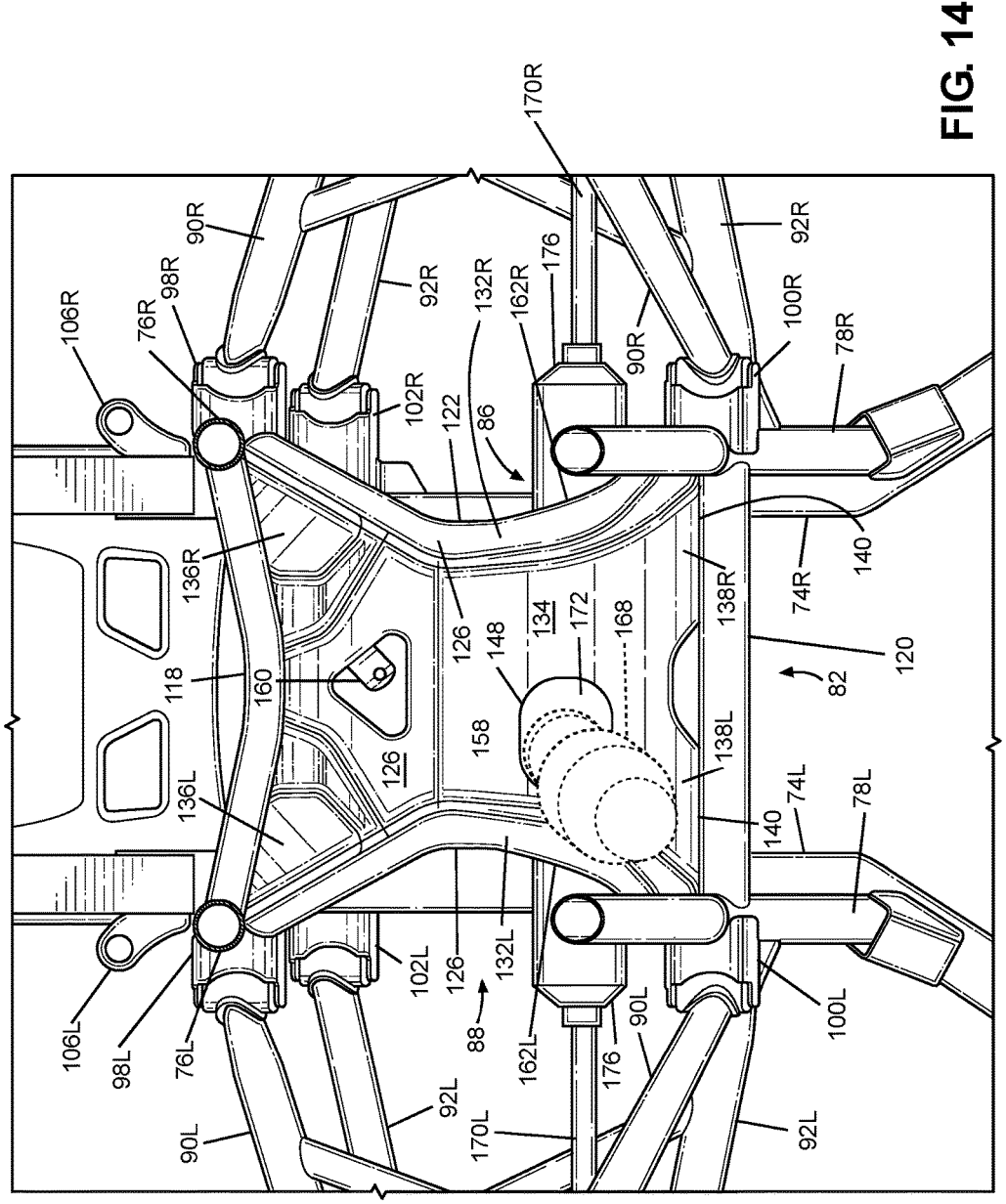
FIG. 14 is a top plan view of the steering rack plate of FIG. 5, a front portion of the frame of FIG. 2, and portions of attached components of the vehicle.

The second front cross member 120 can be connected to and can extend from each of the second frame members 78L, 78R. The second front cross member 120 can extend in the transverse direction T of the vehicle 10. Referring to FIG. 14, the second front cross member 120 can be connected to each of second frame members 78L, 78R at a location that generally opposes the location at which the second upper suspension brackets 100L, 100R are connected to the second frame members 78L, 78R. More specifically, the second front cross member 120 can be connected an area of the of the second frame members 78L, 76R that at least opposes the area on the second frame members 78L, 76R to which the second upper suspension brackets 100L, 100R are mounted. The second front cross member 120 can be a substantially straight member that extends in the transverse direction T of the vehicle 10.

In the exemplary embodiment of FIG. 4, each of the front cross members 118, 120 is configured as a hollow metal tube having a substantially circular cross-section that can be welded to each of the first frame members 76L, 76R and the plate 122. However, exemplary embodiments are intended to include or otherwise cover either one or both of the front cross members 118, 120 being formed of a material other than metal, such as but not limited to carbon fiber, plastic, carbon fiber reinforced plastic, ceramic, pulp, glass fiber reinforced plastic, or other known structural material. Further, exemplary embodiments are intended to include or otherwise cover any one or both of the front cross members 118, 120 connected to the respective ones of the first and second frame members 76L, 76R, 78L, 78R in other ways such as but not limited to threaded fasteners, adhesives, welds, a combination of brackets and threaded fasteners, or rivets.

Figure 5:
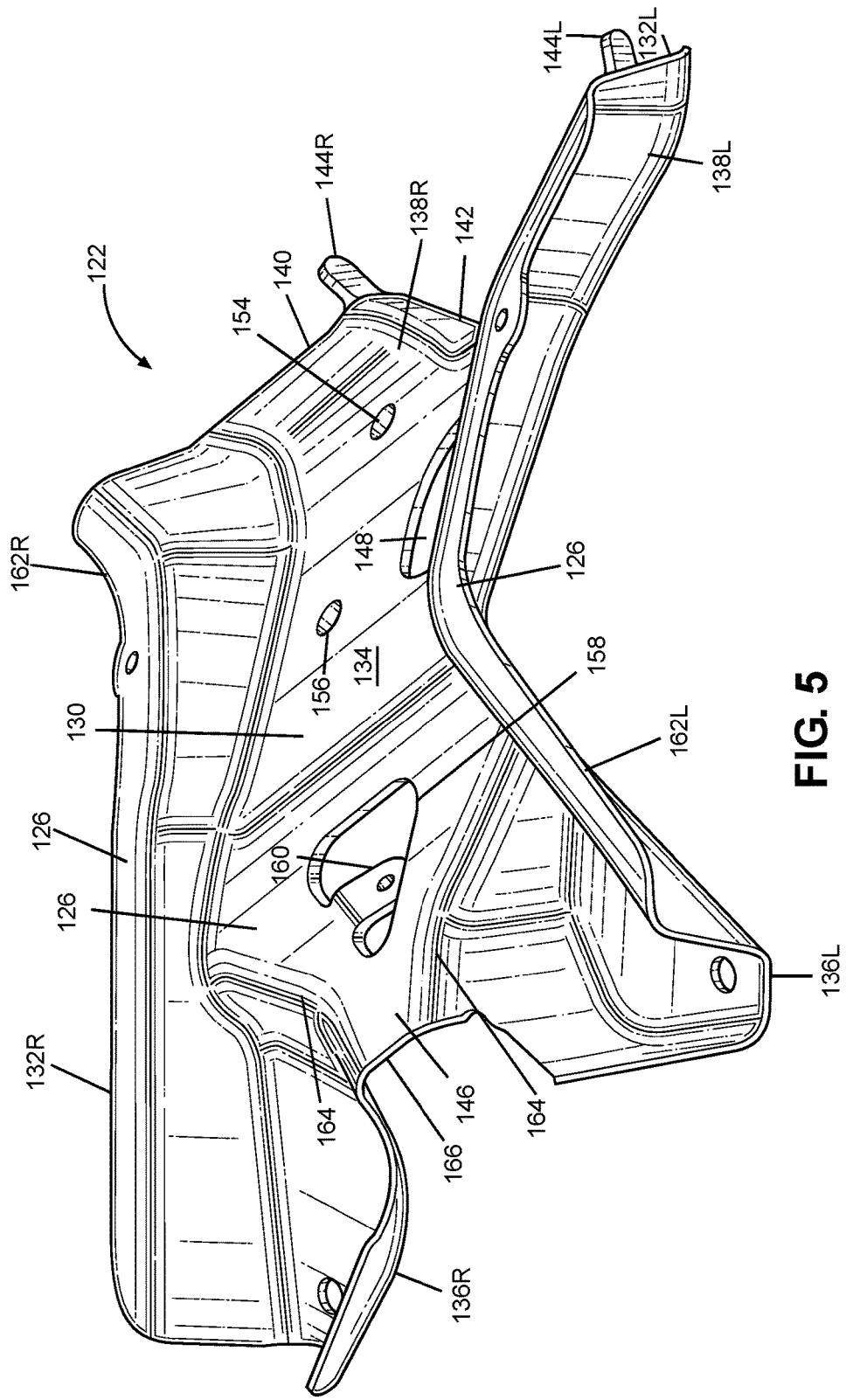
FIG. 5 is a top perspective view of a steering rack plate made in accordance with principles of the disclosed subject matter.
Figure 6:
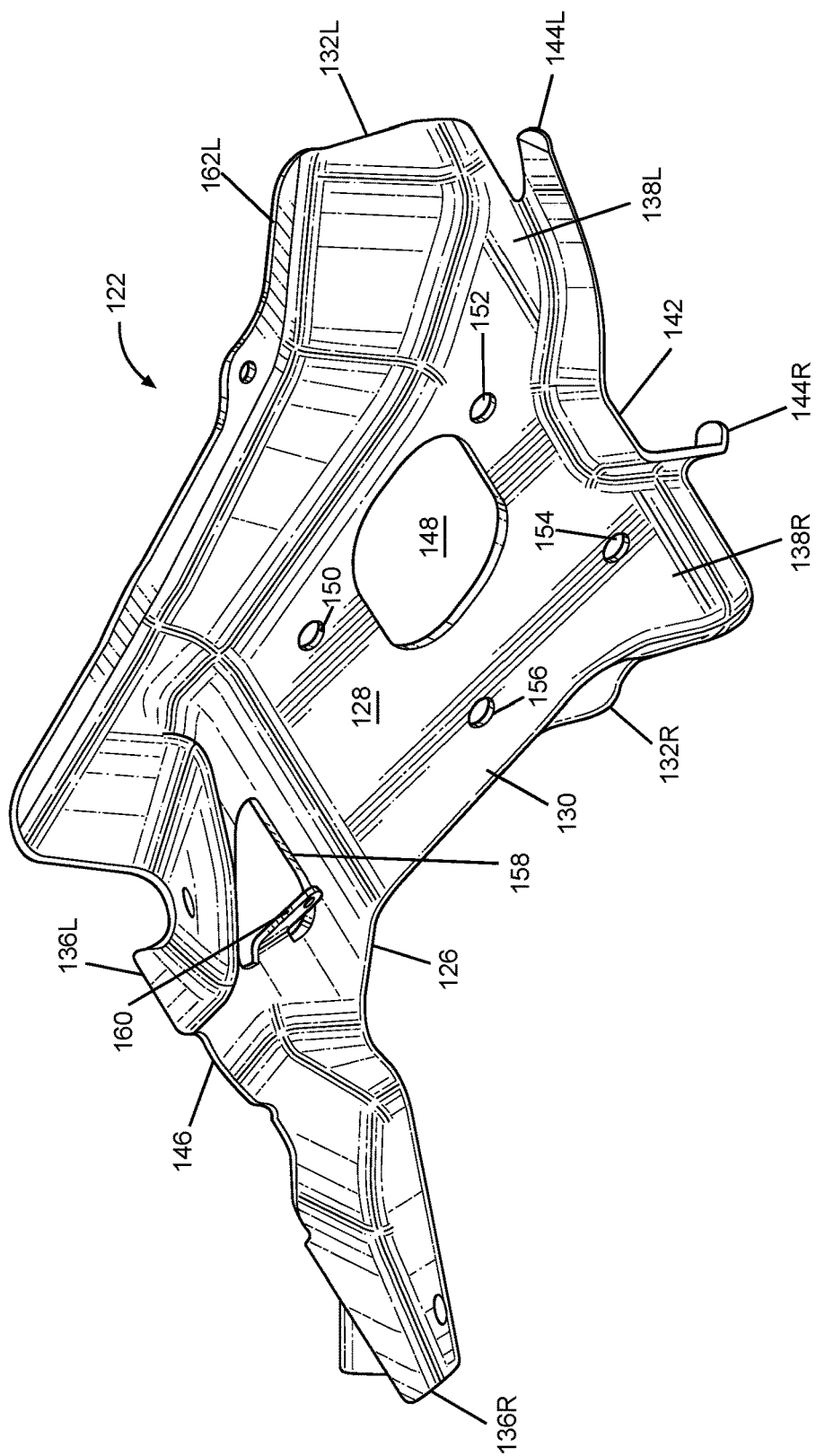
FIG. 6 is a bottom perspective view of the steering rack plate of FIG. 5.

Referring to FIGS. 5 and 6, the plate 122 can be stamped from a flat metal sheet. The plate 122 can extend in the traverse direction T of the vehicle 10 and be connected to each of the front cross members 118, 120. The plate 122 can be connected directly, or indirectly via the front cross members 118, 120, to each of the first and second front frame members 76L 76R, 78L, 78R. The plate 122 can extend in the transverse direction T and the longitudinal direction of the vehicle 10 from each of the first and second frame members 76L, 76R, 78L, 78R.

The plate 120 can include a ridge 126 that extends in the transverse direction T of the vehicle 10. The ridge 126 can extend upwardly in the vertical direction V of the vehicle 10, and away from the front lower frame members 74L, 74R. The ridge 126 can be located on a portion of the plate 122 that is spaced away from each of the first and second front frame members 76L, 76R, 78L, 78R.

The ridge 126 can be configured to cause the plate 122 to buckle in the longitudinal direction L of the vehicle 10 if a load or kinetic energy is applied to the plate 122 in the longitudinal direction L of the vehicle 10 that exceeds a predetermined threshold. For example, the plate 122 can be connected to each of the first front frame members 76L, 76R at a location that is adjacent to the upper bumper brackets 106L, 106R such that the first front frame members 76L, 76R are located between the front bumper assembly 34 and the plate 122. Thus, the front bumper assembly 34 and the plate 122 can be connected to the first front frame members 76L, 76R at a common node such that a substantial portion of a load or kinetic energy input to the upper bumper brackets 106L, 106R can be transferred through the common node of each of the first front frame members 76L, 76R and into the plate 122. Further, the location and shape of the ridge 126 relative to each of the first and second frame members 76L, 76R, 78L, 78R can be selected so that when one or both of the first frame members 74L, 76R is/are deformed by a force or an energy input by the front bumper assembly 34, the plate 122 deforms along the ridge 126. In another example, the ridge 126 can be located above or below the portion(s) of the plate 122 that are connected to the first front frame members 76L, 76R such that a load or kinetic energy input by the front bumper assembly 34 can create a bending moment at the ridge 126, thus causing the plate 122 to deform about the ridge 126.

Further, the plate 122 can be configured to resist deformation when subjected to the load or kinetic energy input via the front bumper assembly 34 until the front bumper assembly 34 initially collapses in a direction toward the main frame assembly 30, and the plate 122 collapses in the direction toward the main frame assembly 30 if the load or the energy input continues to be applied to the first front frame members 76L, 76R via the front bumper assembly 34 after the front bumper assembly 34 initially collapses. For example, the plate 122 can be provided with a geometry, and or a thickness, that provides a bending and/or crush strength that is less than the bending strength of the second front frame members 78L, 78R.

Referring to FIGS. 5 and 6, the plate 122 can include a bottom surface 128 that faces the front lower frame members 74L, 74R. Referring to FIGS. 4, 7-13 and 15, the housing brackets 124L, 124R can be mounted on the bottom surface 128 of the plate 122. The housing brackets 124L, 124R can be spaced apart from each other in the transverse direction T of the vehicle 10. The housing brackets 124L, 124R can extend in the vertical direction V of the vehicle 10 from the bottom surface 128 and toward the front lower frame members 74L, 74R.

The front final drive assembly 88 can be connected to each of the housing brackets 124L, 124R. As will be discussed in detail below, the housing brackets 124L, 124R can be configured to connect the plate 122 to the front final drive assembly 88 such that a load input by the front suspension and wheel assembly can be transmitted to the each of the first frame members 76L, 76R and the front lower frame members 74L, 74R via the front final drive assembly 88 when the front suspension and wheel assembly and the final drive assembly are mounted on the front frame assembly 32.

Referring to FIGS. 5 and 6, the plate 122 can include a central panel 130, a pair of side flanges 132L, 132R, a top surface 134, a pair of concave brackets 136L, 136R, a pair of legs 138L, 138R, a rear edge 140, a rear flange 142, a pair of rear projections 144L, 144R, a longitudinal ridge 146, a first opening 148, a plurality of mounting holes 150, 152, 154, 156, a second opening 158 and a tab 160. (The left side flange 138L obstructs the first and second mounting holes 150, 152 from the view in FIG. 5).

Figure 9:
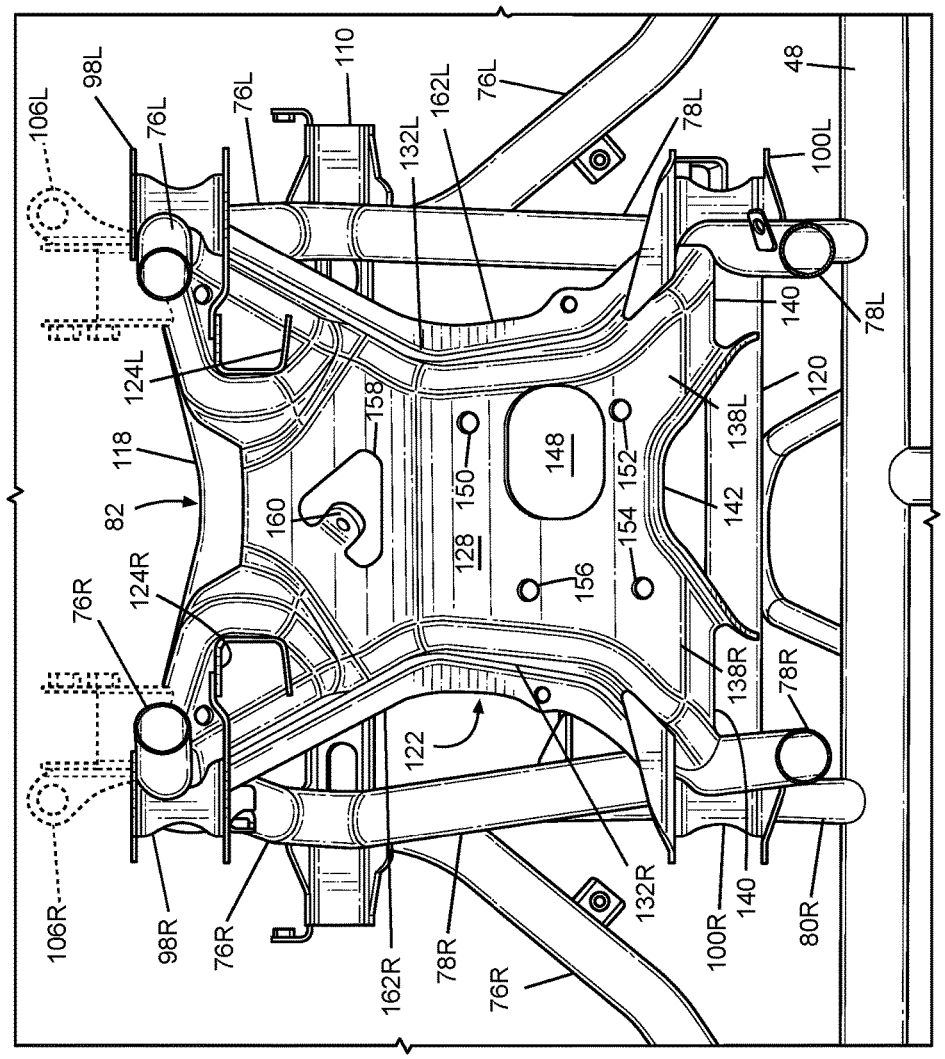
FIG. 9 is a plan view of the bottom of the steering rack plate of FIG. 5 and a front portion of the frame assembly of FIG. 2.
Figure 15:
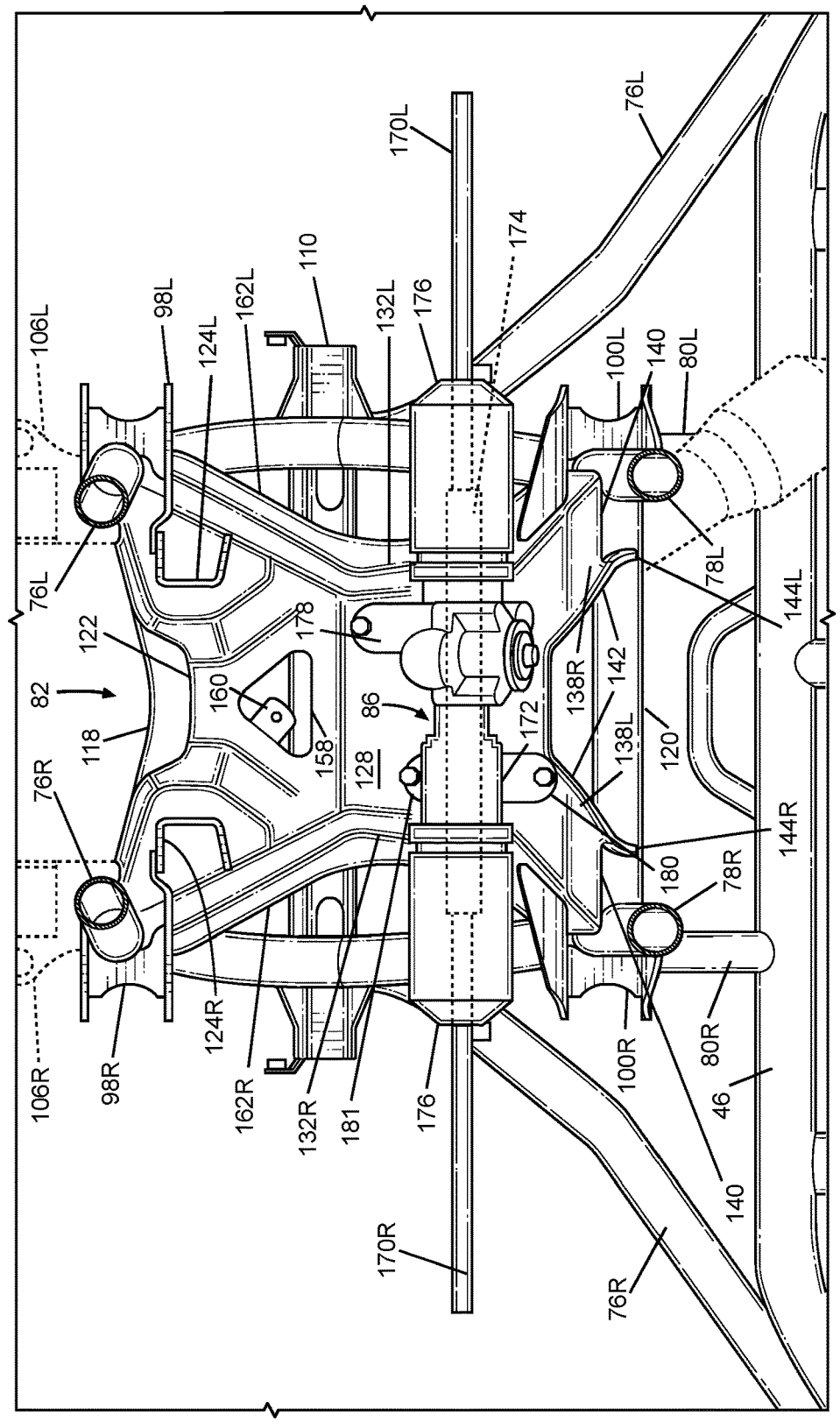
FIG. 15 is a bottom plan view of the steering rack plate of FIG. 5, a front portion of the frame of FIG. 2, and portions of attached components of the vehicle.

The side flanges 132L, 132R can extend along opposite sides of the central panel 130 in the longitudinal direction L of the vehicle 10. The side flanges 132L, 132R can extend away from the central panel 130 in the vertical direction V of the vehicle 10. Referring to FIGS. 9, 14 and 15, the side flanges 132L, 132R can be convex toward each other in the transverse direction T of the vehicle 10.

The side flanges 132L, 132R can be configured to cause the plate 122 to buckle in the longitudinal direction L of the vehicle 10 if a load or kinetic energy is applied to the plate 122 in the longitudinal direction L of the vehicle 10 that exceeds a predetermined threshold. For example, each of the side flanges 132L, 132R can have a thinned portion where the thickness of the side flanges 132L, 132R is less than a remaining portion of the side flanges 132L, 132R.

The transverse ridge 126 can extend along the central panel 130 from one of the side flanges 132L to another one of the side flanges 132R. The transverse ridge 126 can extend along a portion of each of the side flanges 132L, 132R such that the transverse ridge 126 terminates at the transverse outer edge of each of the side flanges 132L, 132R.

The top surface 134 can be on a side of the plate 122 opposed to the bottom surface 128 and facing the radiator 84, hood 13, etc.

Each of the side flanges 132L, 123R can include a top flange 162L, 162R. The top flanges 162L, 162R can be convex on a side (i.e., the top surface 134) of the plate 122 that is opposite to the bottom surface 128. The top flanges 162L, 162R also can be convex toward each other in the transverse direction T of the vehicle 10.

The concave brackets 136L, 136R can extend from a forward edge 164 of the central panel 130 in the traverse direction T and the longitudinal direction L of the vehicle 10. The concave brackets 136L, 136R can be recessed relative to the top surface 134 of the central panel 130. Each of the concave brackets 136L, 136R can abut a respective one of the first frame members 76L, 76R. Each of the side flanges 132L, 132R can form a respective portion of each of the concave brackets 136L, 136R.

The pair of legs 138L, 138R can be located at a rear end of the central panel 130 that is opposite to the front edge 164 in the longitudinal direction L of the vehicle 10. The legs 138L, 138R can extend away from the central panel 130 in the traverse direction T and the longitudinal direction L of the vehicle 10. Each of the legs 138L, 138R can abut a respective one of the second frame members 78L, 78R. Referring to FIGS. 9, 14 and 15, each of the legs 138L, 138R can diagonally oppose a respective one of the concave brackets 136L, 136R such that the plate 122 has a generally X-shaped silhouette.

Referring to FIGS. 5, 6, 9, 14 and 15, the rear edge 140 of the plate 122 that extends along each of the legs 138L, 138R can abut the second cross frame member 120.

The rear flange 142 can extend from the bottom surface 128 of the plate 122 and along the rear edge 140 of the plate. The rear flange 142 can extend along each of the legs 138L, 138R. The rear flange 142 can include a pair of projections 144L, 144R that can extend away from the rear edge 140.

Referring to FIGS. 9 and 15, each of the projections 144L, 144R can be connected to the second cross member 120.

The longitudinal ridge 146 can be centered on the plate 122. The longitudinal ridge 146 can extend from a front edge 166 of the central panel 130 to the transverse ridge 126 in the longitudinal direction L of the vehicle 10.

The first opening 148 can be formed at a location between the transverse ridge 126 and a rear end (for example, the rear edge 140) of the plate 122. The opening 148 is configured to receive a portion of a steering column assembly 168 when the steering column assembly 168 is connected to the steering rack assembly 86.

The mounting holes can be located on the central panel 130 of the plate 122. The mounting holes can be spaced around the first opening 148.

In the exemplary embodiment of FIG. 5, the plate 122 is configured as three-dimensional, homogenously integrated, stamped metal component that can be welded to each of frame members 76L, 76R, 78L, 78R, 118, 120. However, exemplary embodiments are intended to include or otherwise cover a plate 122 formed of a material other than metal, such as but not limited to carbon fiber, plastic, carbon fiber reinforced plastic, ceramic, pulp, glass fiber reinforced plastic, or other known structural material. Further, exemplary embodiments are intended to include or otherwise cover a plate 122 connected to respective ones of the frame members 76L, 76R, 78L, 78R, 118, 120 in other ways such as but not limited to threaded fasteners, adhesives, a combination of brackets and threaded fasteners, welds, rivets, or other structures/materials. Further still, exemplary embodiments are intended to include or otherwise cover a plate 122 assembled from a plurality of separate pieces.

E. Rear Frame Assembly

Referring to FIG. 2, the rear frame assembly 36 can include a plurality of rear frame members 190, 192, 194, 196L, 196R, 198, 200, 202L, 202R, 204L, 204R, 206L, 206R, 208L, 208R. The rear frame members 190, 192, 194, 196L, 196R, 198, 200, 202L, 202R, 204L, 204R, 206L, 206R, 208L, 208R can be configured to define a lower cradle assembly, an upper bed support assembly, and a suspension support assembly. The lower cradle assembly can be configured to mount and supporting the power source and a portion of the rear suspension and wheel assembly in any appropriate manner. The upper bed support can be configured to support a storage area of the vehicle 10. The suspension support assembly can be configured to support another portion of the rear suspension and wheel assembly.

III. Front and Rear Suspension and Wheel Assemblies

The vehicle 10 can include a front suspension and wheel assembly and a rear suspension and wheel assembly. As discussed above, the front suspension and wheel assembly can be connected to the front frame assembly 32. At least a portion of the rear suspension and wheel assembly can be mounted to the rear frame assembly 36.

Referring to FIGS. 3, 4, 10, 11, 14 and 15, the suspension members 90L, 90R, 92L, 92R of the front suspension and wheel assembly can be configured as a double-wishbone suspension system (also referred to as upper and lower A-arms). Each of the suspension members 90L, 90R, 92L, 92R includes a pair of mounting points configured to be connected to a respective pair of the suspension brackets 100L, 100R, 102L, 102R. Each of the suspension members 90L, 90R, 92L, 92R can further include a single mounting point configured to be connected to a wheel hub or knuckle that can rotatably support a respective one of the front wheels 14L, 14R. However, exemplary embodiments are intend to include or otherwise cover suspension members that provide a different geometry and/or include multiple links, a strut, or other appropriate members in order to achieve the desired suspension performance so long as at least one of the suspension members on each side of the front frame assembly 32 is mounted to a suspension mounting bracket in accordance with the first upper mounting brackets 98L, 98R.

The rear suspension and wheel assembly can include the rear wheels 16L, 16R and at least one suspension member for each of the rear wheels 16L, 16R. The rear suspension and wheel assembly can include any appropriate suspension members, such as those described above for the front suspension and wheel assembly. Further, the rear suspension and wheel assembly can have the same type of suspension members as the front suspension and wheel assembly, or can have a different type of suspension members as compared to the front suspension and wheel assembly. For example, the rear suspension and wheel assembly can include a first rear suspension member, a second suspension member and a third suspension member connected on each side of the rear frame assembly 36. The first and second suspension members can be connected to each of the rear frame assembly 36 and a respective one of the rear wheels 16L, 16R. The third rear suspension member can be connected to a rear end portion of the main frame assembly 30 and connected to the respective one of the rear wheels 16L, 16R. In another exemplary embodiment, the rear suspension and wheel assembly can include the first, second and third suspension members described above, and can additionally include a fourth suspension member connected on each side of the rear frame assembly. However, exemplary embodiments are intended to include or otherwise cover a rear suspension and wheel assembly that includes at least one rear suspension member connected to the rear frame assembly 36.

IV. Steering Assembly

The vehicle 10 can include a steering assembly configured to transfer steering inputs from an operator in the passenger compartment of the main frame assembly 30 to the front wheels 14L, 14R. Referring to FIGS. 3, 4, 13-15 collectively, the steering assembly can include a steering wheel, a steering column assembly 168, a steering rack assembly 86, and a pair of tie rods 170L, 170R. The steering column assembly 168 is shown in phantom in each of FIGS. 3, 4, 13 and 14.

As will be discussed in further detail, the steering rack assembly 86 can be mounted to and supported by the transverse frame assembly of the front frame assembly 32. That is, the front frame assembly 32 can include the steering rack assembly 86. The tie rods 170L, 170R can be coupled to the steering rack assembly 86 and to a respective one of the front wheels 14L, 14R. The steering column assembly 168 can pass through the first opening 148 in the plate 122 so that one end can be connected to the steering rack assembly 86 and a second end can be located in the passenger compartment of the main frame assembly 30. The steering wheel can be connected to the second end of the steering column assembly 168.

Referring to FIG. 15, the steering rack assembly 86 can include a steering rack housing 172, a steering rack 174 and a pair of flexible boots 176. The steering rack 174 is schematically illustrated and shown in phantom in FIG. 15.

The steering rack housing 172 can include a plurality of mounting flanges 178, 180, 181. (The steering rack housing can include a fourth mounting flange that is obstructed from view in FIG. 15 by a portion of the steering rack housing 172). Each of the mounting flanges 178, 180, 181 includes a hole that corresponds to the mounting holes 150, 154, 156, respectively, of the plate 122. The mounting flange that is obstructed from view in FIG. 15 can include a hole that corresponds to the second mounting hole 152 of the plate 122. Bolts or other appropriate mechanical fasteners can pass through the mounting flanges 178, 180, 181 and the mounting holes 150, 152, 154, 156 in order to secure the steering rack housing 172 to the plate 122.

The steering rack housing 172 supports the steering rack 174 such that the steering rack 174 can slide within the steering rack housing 172 in the transverse direction T of the vehicle 10. The first end of the steering column assembly 168 can include a pinion gear that engages the steering rack 172 such that rotation of the steering column assembly 168 results in linear displacement of the steering rack 174 in the transverse direction T of the vehicle 10.

Each of the ties rods can be pivotally coupled to a respective end of the steering rack 174 and to the respective one of the front wheels 14L, 14R such that linear displacement of the steering rack 174 results in pivoting of the front wheels 14L, 14R about a kingpin axis associated with the front wheels 14L, 14R.

V. Final Drive Assembly

Figure 13:
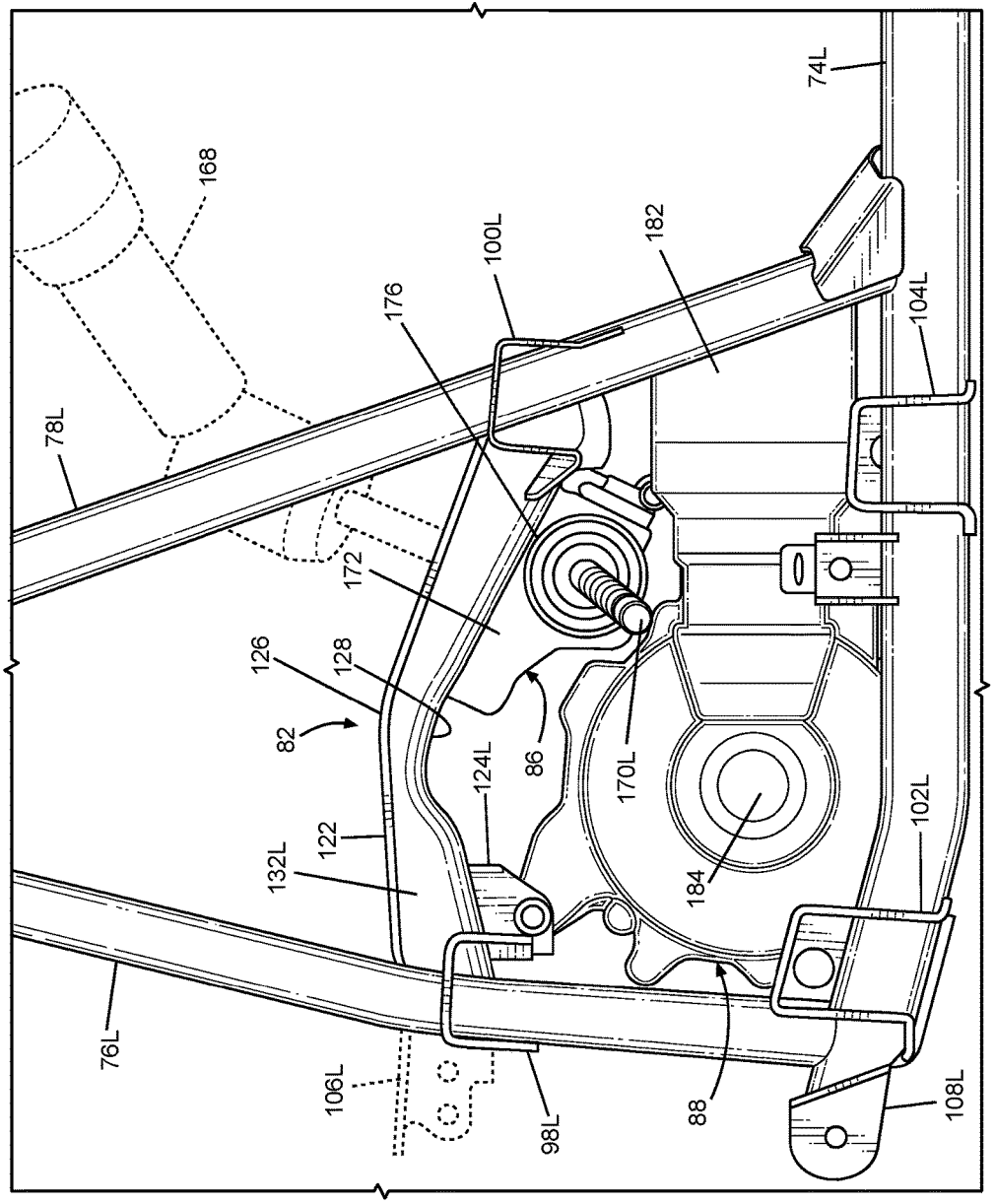
FIG. 13 is a side view of a front portion of the frame assembly of FIG. 2 and attached components of the vehicle.

The final drive assembly 88 can transfer torque output by the power source to each of the front wheels 14L, 14R. Referring to FIGS. 3, 4 10, 11 and 13 collectively, the final drive assembly 88 can include a housing 182, a pair of openings, an upper housing extension 186 and a lower housing extension 188. Only the left-side opening 184 is shown in FIGS. 3, 4 and 13. But it is to be understood that the right-side opening can be identical and located opposite to the left-side opening in the transverse direction T of the vehicle 10.

The housing 182 can contain any appropriate mechanism that can transmit torque input to the mechanism to each of the front wheels 14L, 14R. For example, the housing can contain an input structure and an output structure. The input structure can be configured to receive torque from a power source. The output structure can be configured to transfer at least a portion of the torque to at least one of the wheels 14L, 14R. The input structure can include an input gear driven by the power source. The output structure can be an output gear driven by the input gear. The output gear can drive one or each of a pair of driveshafts r. Each of the driveshafts can drive a respective one of the front wheels 14L, 14R. In another example, a differential gear assembly can couple the output gear to each of the driveshafts such that each of the wheels 14L, 14R can be driven at different speeds and different percentages of the torque input by the power source. In yet another example, a plurality of friction members can be arranged such that torque input by the power source can be differentially distributed to each of the driveshafts.

The upper and lower housing extensions 186, 188 can extend in the transverse direction T of the vehicle 10. As will be discussed in further detail below, the upper housing extension 186 can be connected to each of the housing brackets 124L, 124R. The lower housing extension 188 can be connected to the first lower suspension brackets 102L, 102R in any appropriate manner such as but not limited to threaded fasteners, rivets, welds, adhesives, welds, or any combination thereof.

The driveshafts can include one or more shaft segments and at least one of the shaft segments extends into a respective one of the openings 184. That is, each of the driveshafts can be connected to the output structure contained within the housing 182. The driveshafts can be coupled to the output structure mounted inside of the housing 182 and to a respective one of the front wheels 14L, 14R in any appropriate manner such as but not limited to universal joints, constant-velocity joints, splines, combinations thereof, or via other known output coupling structures.

VI. Load and Kinetic Energy Management Apparatus

As described in further detail below, the features of the front frame assembly 32 described can form a load and kinetic energy management apparatus. The load and kinetic energy management apparatus can distribute throughout the front frame assembly 32 a load or kinetic energy input to the front frame assembly 32 via one or both of the front wheels 14L, 14R as the vehicle 10 travels along an improved or unimproved path such that load concentrations in any one particular component or portion of the front frame assembly 32 can be reduced or prevented. Further, the load and kinetic energy management apparatus can absorb and distribute a load or kinetic energy input via the front bumper assembly 34 such that deformation of the front frame assembly 32 can occur in a predetermined and controlled manner.

The load and kinetic energy management apparatus can include the first upper suspension brackets 98L, 98R connected to the first front frame members 76L, 76R at a first location on the first front frame members 76L, 76R. This first location can be spaced above the front lower frame members 74L, 74R and below a location where the second front fame members 78L, 78R connect to the first front frame members 76L, 76R.

The load and kinetic energy management apparatus can include the housing brackets 124L, 124R connected to a respective one of the first upper suspension brackets 98L, 98R, the plate 122, and a respective one of the first front frame members 76L, 76R. For example, the housing brackets 124L, 124R can be mounted on the bottom surface 128 of the plate 122.

Further, the housing brackets 124L, 124R can abut a respective one of the first upper suspension brackets 98L, 98R. For example, FIGS. 9-11 and 15 illustrate the first upper suspension brackets 89L, 89R as having a flange that extends toward the respective housing bracket 124L, 124R in the transverse direction T of the vehicle 10. Each housing bracket 124L, 124R can abut the flange of the respective one of the first upper suspension brackets 98L, 98R. The housing brackets 124L, 124R can be connected to the respective one of the first upper suspension brackets 98L, 98R in any appropriate manner such as but not limited to welding, threaded fasteners, rivets or adhesives, or any combination thereof.

The load and kinetic energy management apparatus can include the upper housing extension 186. The upper housing extension 186 can extend from the housing 182 of the front final drive assembly 88 to each of the housing brackets 124L, 124R. The upper housing extension 186 can be connected to each of the housing brackets 124L, 124R in any appropriate manner such as but not limited to threaded fasteners, rivets, welds, adhesives, or any combination thereof.

The load and kinetic energy management apparatus can include the housing brackets 124L, 124R. Referring the FIGS. 9-13, 15 and 16, each of the housing brackets 124L, 124R can abut and can be connected to a respective one of the first upper suspension brackets 98L, 98R. The housing brackets 124L, 124R can also abut and can be connected to the first front cross member 118.

The first upper suspension brackets 98L, 98R can cooperate with the housing brackets 124L, 124R such that a load or kinetic energy input into one of the first upper suspension brackets 98L, 98R by the front suspension and wheel assembly can be distributed throughout both sides of the front frame assembly 32, and then distributed into the main frame assembly 30.

For example, a load or kinetic energy input by the left-side upper suspension member 90L can be transferred to the left-side first upper suspension bracket 98L. The first left-side first upper suspension bracket 98L can then distribute the load or kinetic energy to each of the left-side housing bracket 124L and the left-side first front frame member 76L. In turn, the left-side first front frame member 76L can transfer a portion of the load or kinetic energy input to the front lower frame member 74L. Further, the left-side housing brackets 124L can transfer a portion of the load or kinetic energy into the upper housing extension 186. In turn, the housing extension 186 can transfer a portion of the load or kinetic energy input to the right-side housing bracket 124R on the other side of the vehicle 10. From there, the right-side housing bracket 124R can transfer a portion of the load or kinetic energy input to the right-side first front frame member 76R. Subsequently, the right-side first front frame member 76R can transmit a portion of the load or kinetic energy input into the right-side front lower frame member 74R.

A similar example can occur with respect to the right-side upper suspension member 90R. Thus, the load and kinetic energy management apparatus can distribute a load or kinetic energy input by the front suspension and wheel assembly to both sides of the front frame assembly 32 such that each of the front lower frame members 74L, 74R can distribute a respective portion of the load or kinetic energy input by each of the upper suspension members 90L, 90R throughout the front frame assembly 32 and then into the main frame assembly 30.

The load and kinetic energy management apparatus can include the front bumper assembly 34 and the transverse frame assembly 82. The front bumper assembly 34 can be connected to a second location on each of the first front frame members 76L, 76R that is adjacent to the first location where the first upper suspension brackets 98L, 98R are connected. For example, first upper suspension brackets 98L, 98R and the front bumper assembly 34 can be connected to a common length of the first frame members 76L, 76R that is spaced away from the lower frame members 74L, 74R in the vertical direction V of the vehicle 10. The transverse frame assembly 82 can connected to the first front frame members 76L, 76R at a third location that is adjacent to the each of the first and second locations. For example, the first front cross member 118 of the transverse frame assembly 82 can be connected to the common length of the first frame members 76L, 76R to which the front bumper assembly 34 first upper suspension brackets 98L, 98R are connected. That is, the load and energy management apparatus can include the first front cross member 118 connected to each of the first frame members at the third location such that the first location, the second location and the third location on the common length of the first front frame members 76L, 76R can define a common node through which the load and energy management apparatus can transmit a load or kinetic energy input in each of the transverse direction T of the vehicle 10 and the longitudinal direction L of the vehicle 10 to the front lower frame members 74L, 74R and the main frame 30.

Figure 16:
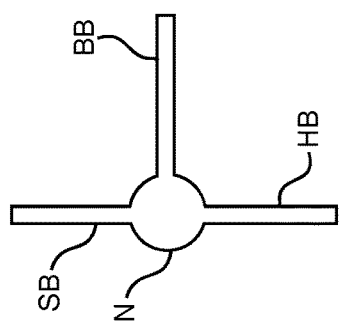
FIG. 16 is a schematic view of a node formed by portions of the frame assembly of the vehicle of FIG. 1.

FIG. 16 is a schematic representation of an exemplary node N that can be formed in a region of a frame member (such as but not limited to one of the first front frame members 74L, 74R) by a suspension bracket SB (such as but not limited to one of the upper suspension brackets 98L, 98R), a bumper bracket (such as but not limited to one of the upper bumper brackets 106L, 106R), and a housing bracket HB (such as but not limited to one of the housing brackets 124L, 124R).

In the exemplary embodiment described above, when following the load and energy distribution paths described above, the load and energy management apparatus can transmit a load or kinetic energy input to one of the first front frame members 76L, 76R to each of the front lower frame members 74L, 74R via the upper housing extension 186 and a different one of the first frame members 74L, 74R. Further, the load and energy management apparatus can transmit a load or kinetic energy input by the front bumper assembly 34 to the plate 122 such that the plate 122 can resist the load or kinetic energy input via the front bumper assembly 34 until the front bumper assembly 34 initially collapses in the longitudinal direction L of the vehicle 10. Further, the plate 122 can collapse in the direction toward the main frame assembly 30 if the load or kinetic energy continues to be inputted to the first front frame members 76L, 76R via the front bumper assembly 34 after the front bumper assembly 34 initially collapses. Accordingly, the frame assembly 18 of the vehicle 10 can provide rigidity sufficient to absorb and distribute a load or kinetic energy input by the front suspension and wheel assembly without undesirable deformation of the front frame assembly 32. Further, the frame assembly 18 of the vehicle 10 can provide an ability to absorb and distribute a load or kinetic energy input by the front bumper assembly 34 that can permit deformation of the front frame assembly 32 in a predetermined and controlled manner.

VII. Alternative Embodiments

While certain embodiments of the invention are described above, and FIGS. 1-15 disclose a best mode for practicing the various inventive aspects, it should be understood that the invention can be embodied and configured in many different ways without departing from the spirit and scope of the invention.

For example, embodiments are disclosed above in the context of a vehicle 10 shown in FIG. 1. However, embodiments are intended to include or otherwise cover any type of vehicle disclosed above. For example, exemplary embodiments are intended to include or otherwise cover any type of vehicle that can travel on an improved surface such as but not limited to a paved road.

Exemplary embodiments are intended to include or otherwise cover any type of front frame assembly 32. In other words, exemplary embodiments are intended to cover any application of front frame assembly that can sustain load or kinetic energy inputs from a front suspension and wheel assembly while also being capable of responding in a predetermined and controlled manner to a load or kinetic energy input in the longitudinal direction of the vehicle 10. For example, one or both of the first and second frame members can be made from a plurality of parts or made as a unitary homogenous component.

Exemplary embodiments are intended to include any appropriate shape for each of the first and second frame members. Further, exemplary embodiments are intended to include the first frame members and the second frame members divided differently as compared to the first and second frame members described above. For example, exemplary embodiments are intended to include or otherwise cover a first frame member that terminates at a junction with the second frame member, and the second frame member includes a second end that is connected to the main frame assembly.

Exemplary embodiments are intended to include or otherwise cover the first frame member or the second frame connected to any appropriate portion of the main frame assembly.

Exemplary embodiments are intended to include or otherwise cover any type of front suspension and wheel assembly. For example, embodiments are disclosed in the context of an upper suspension member and a lower suspension member that are configured as A-arms (also referred to as wishbones). Exemplary embodiments are intended to include an upper suspension member that has a unique geometry compared to the lower suspension member. Exemplary embodiments are also intended to include an upper suspension member that has the same geometry compared to the lower suspension member. Further, exemplary embodiments are intended to include a front suspension and wheel assembly that includes one or more suspension members configured differently than the upper suspension member and the lower suspension member, and used in place of the upper suspension member and/or the lower suspension members.

Embodiments are disclosed above in the context of vehicle 10 shown in FIG. 1 having a front frame assembly that includes a front bumper assembly. However, embodiments are intended to include or otherwise cover any a vehicle that includes a rear frame assembly, a rear bumper assembly and a rear suspension and wheel assembly configured in a manner as described above with respect to the front frame assembly, the front bumper assembly and the front suspension and wheel assembly.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A front frame assembly of a vehicle, the front frame assembly configured to support a front suspension and wheel assembly and configured to be connected to a front portion of a main frame assembly of a vehicle, the main frame assembly configured to define a passenger compartment of the vehicle, the front frame assembly comprising:

a pair of lower frame members extending in a longitudinal direction of the vehicle and spaced apart from each other in a transverse direction of the vehicle, each of the lower frame members including a first end configured to be connected to the main frame assembly;

a pair of first frame members connected to and extending upwardly from a respective one of the lower frame members;

a pair of second frame members connected to and extending upwardly from a respective one of the lower frame members, each of the second frame members having a first end connected to the respective one of the lower frame members and a second end connected to a respective one of the first frame members, each of the first frame members and the second frame members configured to movably support a different respective portion of the front suspension and wheel assembly;

a cross frame member connected to and extending from each of the first frame members;

a plate connected to and extending from the each of the first frame members, the cross frame member, and the second frame members such that a load or kinetic energy applied to any one of first and second frame members by the front suspension and wheel assembly is transferred to each of the lower frame members when the front suspension and wheel assembly is connected to the first and second frame members, the plate includes a ridge extending in a transverse direction of the vehicle and configured to cause the plate to buckle in the longitudinal direction of the vehicle if a load or kinetic energy applied to the plate in the longitudinal direction of the vehicle exceeds a predetermined threshold, and the plate includes a bottom surface that faces the lower frame members.

2. The front frame assembly of a vehicle according to claim 1, further comprising a front bumper assembly connected to each of the first frame members at a first location that is adjacent to the plate member such that the first frame members are located between the front bumper assembly and the plate, wherein the plate is configured to resist deformation when subjected to a load or kinetic energy input via the front bumper assembly until the front bumper assembly initially collapses in a direction toward the main frame assembly, and the plate is further configured to collapse in the direction toward the main frame assembly if the load or the energy input continues to be applied to the first frame members via the front bumper assembly after the front bumper assembly initially collapses.

3. The front frame assembly of a vehicle according to claim 1, further comprising a pair of housing brackets configured to connect the plate to a front final drive assembly such that a load input by the front suspension and wheel assembly is transmitted to the each of the first frame members and the lower frame members via the front final drive assembly when the front suspension and wheel assembly and the final drive assembly are mounted on the front frame assembly.

4. The front frame assembly of a vehicle according to claim 3, wherein each of the first frame members includes a suspension mounting bracket configured to be connected to a respective portion of the front suspension and wheel assembly, and each of the housing brackets abuts and is connected to a respective one of the suspension brackets.

5. The front frame assembly of a vehicle according to claim 1, wherein the plate includes a central panel and a pair of side flanges, the side flanges extend along opposite sides of the central panel in the longitudinal direction of the vehicle, and the ridge extends along the central panel from one of the side flanges to another one of the side flanges, and the side flanges are configured to cause the plate to buckle in the longitudinal direction of the vehicle if a load or kinetic energy applied to the plate in the longitudinal direction of the vehicle exceeds a predetermined threshold.

6. The front frame assembly of a vehicle according to claim 5, wherein the plate further includes a top surface and a pair of concave brackets, the top surface is on a side of the plate that is opposite to the bottom surface, the concave brackets extend from a forward edge of the central panel and recessed relative to the top surface of the central panel, each of the concave brackets abuts a respective one of the first frame members, and each of the side flanges forms a respective portion of each of the concave brackets.

7. The front frame assembly of a vehicle according to claim 6, wherein the plate further includes a pair of legs located at a rear end of the central panel, the legs extend away from the central panel, each of the legs abuts a respective one of the second frame members, and each of the legs diagonally opposes a respective one of the concave brackets such that the plate has an X-shaped silhouette, and.

the plate is a stamped metal plate such that the central panel, the side flanges, the concave brackets, and the legs are a single homogenous unit.

8. The front frame assembly of a vehicle according to claim 5, wherein the side flanges are convex toward each other in the transverse direction of the vehicle.

9. The front frame assembly of a vehicle according to claim 5, wherein each of the side flanges includes a top flange that is convex on a side of the plate that is opposite to the bottom surface.

10. The front frame assembly of a vehicle according to claim 5, further comprising:

a second cross frame member extending from and connected to each of the second frame members, wherein the plate further includes a rear edge and a rear flange, the rear edge abuts the second cross frame member, the rear flange extends from the bottom surface and along the rear edge of the plate, and the rear flange includes a pair of projections extending away from the rear edge and connected to the second cross member.

11. The front frame assembly of a vehicle according to claim 1, wherein the plate further includes a second ridge centered on the plate and extending along a longitudinal direction of the vehicle.

12. The front frame assembly of a vehicle according to claim 1, further comprising:

a steering rack assembly including a steering rack housing and a steering rack supported in the steering housing and movable in the housing along the transverse direction of the vehicle, and the steering rack housing is mounted to the bottom surface of the plate, wherein the plate further includes an opening formed at a location between the ridge and a rear end of the plate, and the opening is configured to receive a portion of a steering column when the steering column is connected to the steering rack assembly.

13. The front frame assembly of a vehicle according to claim 12, wherein the plate further includes a plurality of mounting holes spaced around the opening, and the steering rack assembly is secured to the plate via the mounting holes.

14. The front frame assembly of a vehicle according to claim 1, wherein the plate is welded to each of the first frame members, each of the second frame members, and the cross frame member.

15. A frame assembly for a vehicle comprising:
a main frame assembly defining a passenger compartment of the vehicle;
a rear frame assembly connected to and extending from a rear end of the main frame assembly, the rear frame assembly configured to mount at least a portion of a rear suspension and wheel assembly; and
a front frame assembly connected to and extending from a front portion of the main frame assembly of the vehicle such that the main frame assembly extends between the front frame assembly and the rear frame assembly in a longitudinal direction of the vehicle, the front frame assembly configured to mount a front suspension and wheel assembly, the front frame assembly including:
 a pair of lower frame members, each of the lower frame members including a first end connected to the main frame assembly;
 a pair of first frame members connected to and extending upwardly from a respective one of the lower frame members;
 a pair of second frame members connected to and extending upwardly from a respective one of the lower frame members, each of the second frame members having a first end connected to the respective one of the lower frame members and a second end connected to a respective one of the pair of first frame members, each of the first frame members and the second frame members configured to movably support a different respective portion of the front suspension and wheel assembly;
 a cross frame member connected to and extending between each of the first frame members; and
 a plate attached to each of the first frame members, the cross frame member, and the second frame members, and the plate including a ridge extending in a transverse direction of the vehicle and configured to cause the plate to buckle in the longitudinal direction if an input load or an input energy is applied to the plate in the longitudinal direction of the vehicle that exceeds a predetermined threshold.

16. The frame assembly according to claim 15, further comprising a front bumper assembly connected to each of the first frame members at a first location adjacent to the plate such that the first frame members are located between the bumper assembly and the plate,
 wherein the plate resists deformation when subjected to a load or an energy input via the front bumper assembly until the front bumper assembly initially collapses in a direction toward the main frame assembly, and the plate is configured to collapse in the direction toward the main frame assembly if the load or the energy input continues to be applied to the front frame members via the front bumper assembly after the front bumper assembly initially collapses.

17. A vehicle comprising:
the frame assembly according to claim 16;
a pair of suspension brackets, each suspension bracket connected to a respective one of the front frame members;
a front suspension and wheel assembly including,
 a first suspension member movably connected to the suspension bracket of a first one of the first frame members;
 a second suspension member movably connected to the suspension bracket of a second one of the first frame members;
 a first wheel movably connected to the first suspension member; and
 a second wheel movably connected to the second suspension member;
a front final drive assembly mounted on the lower frame members, the final drive the final drive assembly including a final drive housing and a pair of half shafts, each of the half shafts has a first end rotatably supported by the final drive housing and second end connected to a respective one of the front wheels, the final drive housing is connected to each of the suspension brackets such that a load input by one of the first and second suspension members to a respective one of the first frame members is transferred to each of the lower frame members via the final drive housing;
a power source connected the front final drive assembly; and
a steering rack assembly including a steering rack housing and a steering rack supported in the steering rack housing and movable in the steering rack housing along the transverse direction of the vehicle, the steering rack connected to the first wheel and the second wheel, and the steering rack housing is mounted to a bottom surface of the plate.

18. The vehicle according to claim 17, wherein the plate further includes a pair of housing brackets connected to the bottom surface of the plate, each of the housing brackets abuts a respective one of the suspension brackets, and the final drive housing is connected to each of the housing brackets.

19. A front frame assembly of a vehicle, the front frame assembly configured to support a front suspension and wheel assembly and configured to be connected to a front portion of a main frame assembly of a vehicle, the main frame assembly configured to define a passenger compartment of the vehicle, the front frame assembly comprising:
 a pair of first frame members extending upwardly;
 a pair of second frame members extending upwardly;
 a plate connected to and extending from each of the first frame members and the second frame members, the plate including a ridge extending in a transverse direction of the vehicle and configured to cause the plate to buckle in the longitudinal direction of the vehicle if a load or kinetic energy applied to the plate in the longitudinal direction of the vehicle exceeds a predetermined threshold.

20. The front frame assembly of a vehicle according to claim 19, wherein the plate includes a bottom surface; and
 a steering rack assembly is mounted to the bottom surface of the plate.

* * * * *